United States Patent
Couleaud et al.

(10) Patent No.: US 12,470,770 B2
(45) Date of Patent: Nov. 11, 2025

(54) SYSTEM AND METHODS FOR CREATING A PROFILE BASED ON CONTENT CLUSTERING

(71) Applicant: Adeia Guides Inc., San Jose, CA (US)

(72) Inventors: Jean-Yves Couleaud, Mission Viejo, CA (US); Reda Harb, Tampa, FL (US); Aldis Sipolins, Somerville, MA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/590,765

(22) Filed: Feb. 28, 2024

(65) Prior Publication Data
US 2025/0274634 A1     Aug. 28, 2025

(51) Int. Cl.
| | |
|---|---|
| H04N 21/45 | (2011.01) |
| H04N 21/431 | (2011.01) |
| H04N 21/442 | (2011.01) |
| H04N 21/472 | (2011.01) |

(52) U.S. Cl.
CPC ..... *H04N 21/4532* (2013.01); *H04N 21/4312* (2013.01); *H04N 21/44204* (2013.01); *H04N 21/472* (2013.01)

(58) Field of Classification Search
CPC ........... H04N 21/4532; H04N 21/4312; H04N 21/44204; H04N 21/47
See application file for complete search history.

(56) References Cited

U.S. PATENT DOCUMENTS

| | | |
|---|---|---|
| 2003/0097300 A1 | 5/2003 | Gutta et al. |
| 2007/0239554 A1 | 10/2007 | Lin et al. |
| 2013/0321165 A1 | 12/2013 | Johannessen |
| 2021/0321165 A1 | 10/2021 | Yasir |

OTHER PUBLICATIONS

Alexis C. Madrigal, "How Netflix Reverse-Engineered Hollywood", (https://www.theatlantic.com/technology/archive/2014/01/how-netflix-reverse-engineered-hollywood/282679/), (Jan. 2, 2014).
Netflix Help Center, "How to create, change, or delete profiles", (https://help.netflix.com/en/node/10421), (1 page).
Netflix Help Center, "How to see viewing history and device activity", (https://help.netflix.com/en/node/101917), (1 page).
Netflix Help Center, "Profile transfers", (https://help.netflix.com/en/node/122698), (1 page).
Wikipedia, "k-means clustering", (https://en.wikipedia.org/wiki/K-means_clustering), (May 3, 2024), (7 pages).

*Primary Examiner* — Anthony Bantamoi
(74) *Attorney, Agent, or Firm* — HALEY GUILIANO LLP

(57) ABSTRACT

Systems and methods are provided herein for enabling a media content system to create an exclusive profile based on a joint profile that was used to interact with a plurality of content items provided by a media service. The joint profile contains consumption data for all users who interacted with the plurality of content items. Based on the consumption data, the system identifies a plurality of clusters containing content items with similar metadata and generates a user interface with an identifier corresponding to each cluster and identifiers corresponding to the content items of each cluster. In response to receiving a selection of a subset of the clusters, the system generates an exclusive profile with the selected clusters. The exclusive profile contains the consumption data associated with the content items of the selected clusters and the system then recommends content items to the exclusive profile based on that consumption data.

20 Claims, 15 Drawing Sheets

SYSTEM AND METHODS FOR CREATING A PROFILE BASED ON CONTENT CLUSTERING

BACKGROUND

This disclosure is related to creating profiles associated with an account of a media content provider.

SUMMARY

Media content systems (e.g., over-the-top video streaming providers) commonly provide access to media content to subscribers on devices associated with accounts. For example, a media content system may require an account to be established before service is provided. The media content system then provides services after credentials (e.g., username/password) are submitted to authenticate an access to that account. In some approaches, the media content system tracks consumption history associated with the account (e.g., which items were searched for, consumed, liked, etc.). The media content system may then use the consumption history to provide recommendations to devices associated with the account.

Sometimes, such a single account is used by multiple users to access the media content system. For example, several users may share credentials (e.g., because they live in the same household). In such cases, the media content system gathers consumption history based on inputs and interactions of a plurality of users. The recommendations will, consequently, also be based on inputs and interactions of a plurality of users.

As a result, the media content system will provide recommendations based on such joint consumption regardless of which one of the users is operating a device logged in to the account. This results in the media content system sending a mix of content recommendations that are based on the various media consumption habits of many individual users in the household.

In one approach, media content systems allow for the creation of multiple profiles for the same account. For example, after log in, the media content system may request input identifying a profile or prompting a creation of a new profile. Then, the media content system can track consumption history and provide recommendations separately for each profile in the same account. However, this does not fully solve the problem of mixed profiles because users of a household may elect to share a single profile to avoid having to switch from one profile to another on a community device, such as a TV, in a living room that may be used by more than one person in the household, or simply because the household may not be aware of an option to create multiple profiles. Consequently, the recommendations that the media content system provides to that account/profile are based on the various media consumption habits of many individual users in the household. Multiple users contributing to a single set of recommendations introduces noise to the consumption data, thus making it harder for the media content system to filter out irrelevant recommendations, which in turn depletes available bandwidth by delivering irrelevant content, uses unnecessary storage space by causing the media content system to retain records of the irrelevant content sent to the profile, and wastes user interface space on irrelevant recommendations, among other issues. Furthermore, when multiple users in a household share a single profile, the media content system may not be able to accurately determine how many users are making use of the account, which makes it difficult for the system to enforce password-sharing restrictions.

In some approaches, media content systems attempt to address these issues by allowing cloning of a profile (e.g., to transfer to another account). This does not solve the issue of mixed recommendations, since transferring the entire cloned profile to another account does not distinguish between the consumption habits of different users. For example, when a member of the household leaves the household, they may transfer the cloned profile to a new account, but the media consumption habits of the other household members remain and continue to influence the media recommendations provided to the cloned profile on the new account. This creates a sub-optimal situation when, for example, a couple splits, when a child leaves the nest, or when one user decides to create an individual account, since the media content system cannot distinguish between the consumption habits of the users still using the account and the user who has left.

To overcome these problems, example systems and methods are provided herein for generating an exclusive profile associated exclusively with a first user that is based on a joint profile that was previously used to request a plurality of content items from the media content system by at least the first user and a second user. In some embodiments, the joint profile comprises consumption data for the plurality of content items (e.g., requested by a plurality of users via the same profile), and the media content system identifies a plurality of clusters of the plurality of content items of the joint profile. In some examples, each cluster comprises content items with similar metadata (e.g., determined using a k-means clustering algorithm). In some implementations, the media content system generates for display a user interface that, for each respective cluster of the plurality of clusters, displays an identifier of the respective cluster and a plurality of identifiers of representative content items of the respective cluster. In some embodiments, the media content system receives a user interface selection of at least one subset of the clusters and creates the exclusive profile with consumption data for content items of the selected subset of clusters (e.g., excluding consumption data from unselected clusters). As a result, the media content system generates for display a set of recommendations based on the exclusive profile. Such aspects enable a media content system to determine which consumption data is associated with each exclusive profile and to create a respective exclusive profile for a single user. Therefore, an exclusive profile associated with a single user includes the consumption history and recommendations of that user alone. This allows the media content system to maximize the accuracy of the recommendations it provides and therefore accurately distinguish between the consumption habits of various users.

For example, a joint profile contains consumption data associated with content items based on the consumption habits of multiple users within the household. The media content system, in creating the exclusive profile, correlates the consumption data into a series of content property vectors based on content properties associated with each content item that was consumed. The results of the clustering process allow the media content system to determine how many individual users the account/profile may be composed of. For example, based on the number of content property vectors being clustered, the clustering process may result in more than one cluster, where each cluster corresponds to the media consumption preferences of a user or group of users. The media content system determines an identifier that corresponds to each created cluster. The media content system also determines recommendations of representative content items that correspond to each of the created preference clusters and presents identifiers associated with the representative content items via the user interface. The media content system, in some approaches, also presents an identifier corresponding to a recommendation for a collection of representative content items, such as, for example, a movie trilogy, a content series, or an entire cinematic universe (e.g., Marvel). In some embodiments, the media content system receives a selection of one or more identifiers of the clusters, which will ultimately appear in the exclusive profile that comprises consumption data for the selected clusters of content items. The media content system may also receive user input to refine the recommendations by modifying the identified clusters. Based on the generated exclusive profile, the media content system generates additional recommendations of content items that are associated with the exclusive profile.

As another example, a profile corresponding to a single user may also be split, allowing for the creation of sub-profiles that comprise subsets of the recommendations for specific categories of content. For example, the media content system may receive a selection to split a profile used by a single user that comprises recommendations for a plurality of content categories, such as "documentaries" and "comedies". The media content system splits the profile and creates one or more sub-profiles, such as for example, one sub-profile comprising recommendations for "documentaries" and another sub-profile comprising recommendations for "comedies."

In some embodiments, the consumption data associated with multiple users of a household contains viewing progress point data corresponding to the content items consumed via the joint profile. This information previously served no purpose, as the ability to split profiles did not exist. However, when the exclusive profile is created, there may arise a need to distinguish between the viewing progress point data associated with each user of the household. The system generates a user-selectable option to resume playing a specific content item from the corresponding viewing progress point. In response to receiving a user selection that rejects the option, the consumption data associated with a different profile is updated with the corresponding viewing progress point. In other embodiments, the system may display all viewing progress points associated with a content item and may receive a user selection to manually assign each respective viewing progress point to a different profile.

In some embodiments, the media content system receives a user request to consume a content item that was not initially included in any of the clusters selected for inclusion in the exclusive profile. As a result, the media content system adds the consumption data for the cluster corresponding to the requested content item to the exclusive profile. Furthermore, in additional embodiments, the media content system generates a user-selectable option to continue providing recommendations from the cluster that was not selected for inclusion in the exclusive profile.

In some embodiments, the plurality of identifiers of representative content items are generated for display in an order based on distances of the content items from a center of the respective cluster, where the representative identifiers associated with the outliers farthest from the center of the respective cluster are displayed before the representative identifiers associated with content items closest to the center of the respective cluster. In further embodiments, identifiers of representative content items may be ordered based on a content item consumption date/time.

In some embodiments, the media content system attempts to extract additional preference clusters based on user inputs to manipulate certain representative identifiers associated with recommended content items. Such a manipulation, in some approaches, includes removing a representative identifier or favoriting a representative identifier. As a result, the media content system adjusts the radius of the respective cluster and re-runs the clustering process to generate new clusters based on the adjusted radius. Alternatively, the media content system, in some implementations, receives user input to manipulate identifiers associated with recommended content items and splits an existing cluster into one or more sub-clusters that better represent a user's preferences.

BRIEF DESCRIPTION OF DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
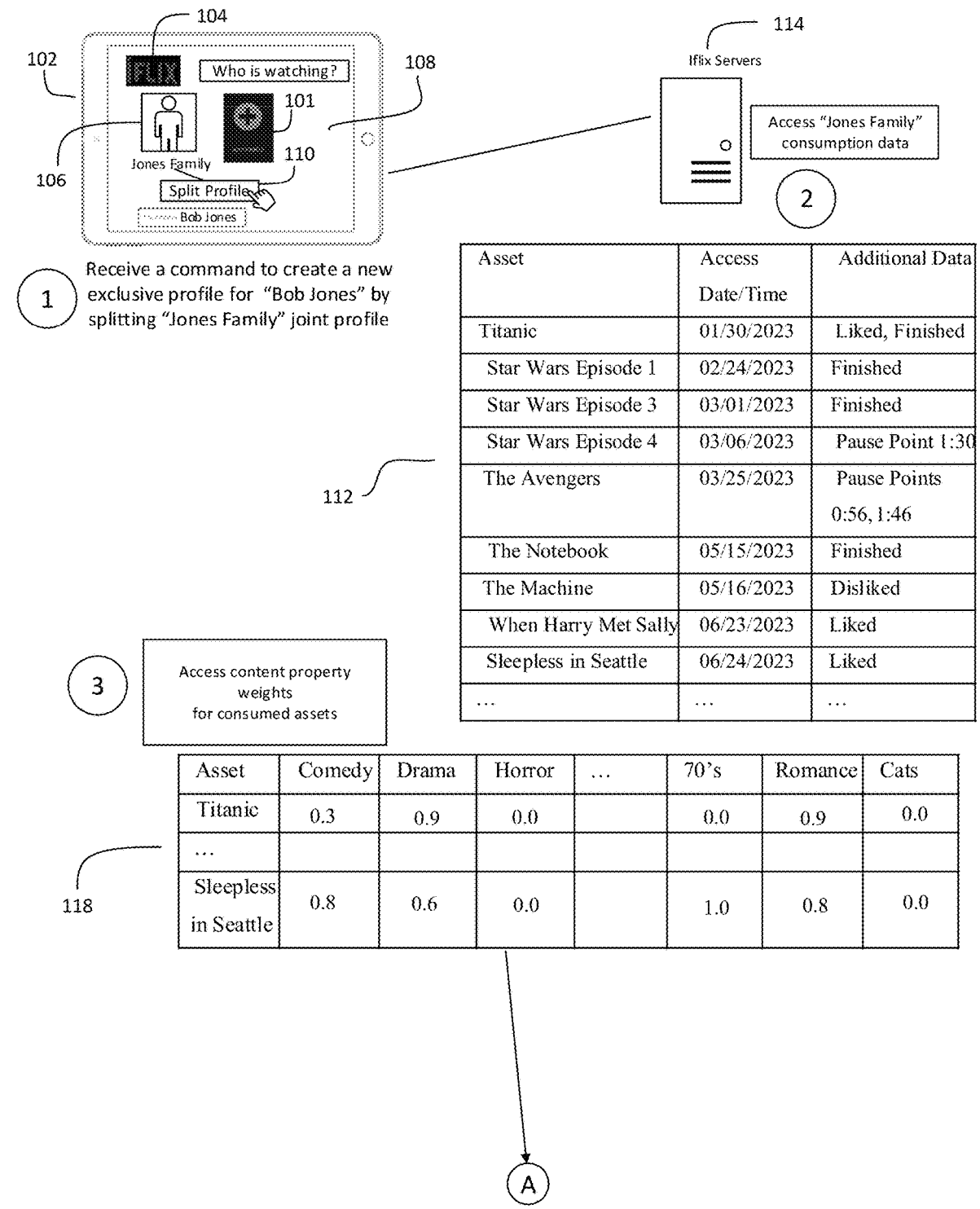
FIG. 1A is a schematic example of splitting a profile associated with an account of a media content system, in accordance with embodiments of the disclosure.
Figure 1B:
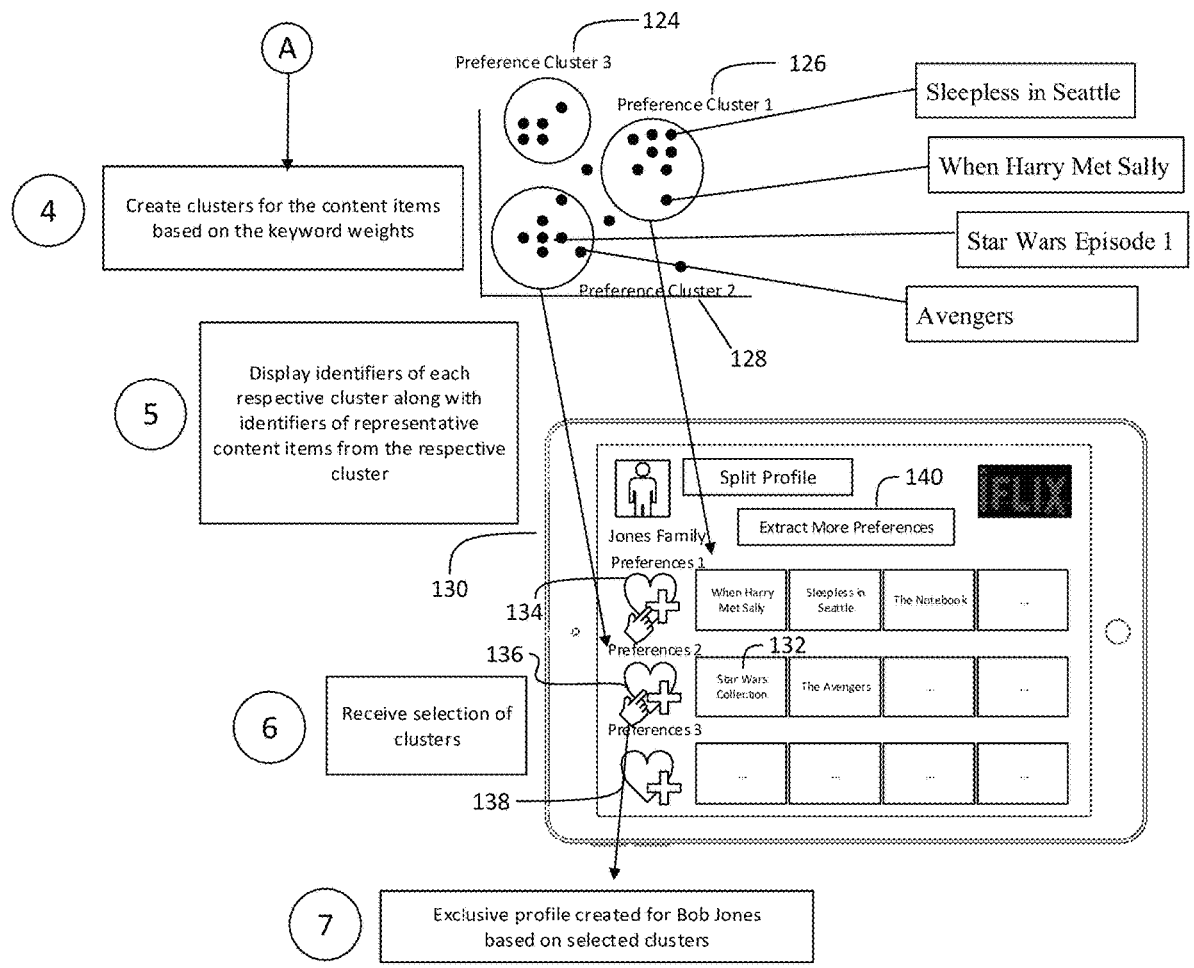
FIG. 1B is a schematic example of splitting a profile associated with an account of a media content system, in accordance with embodiments of the disclosure.
Figure 1B:
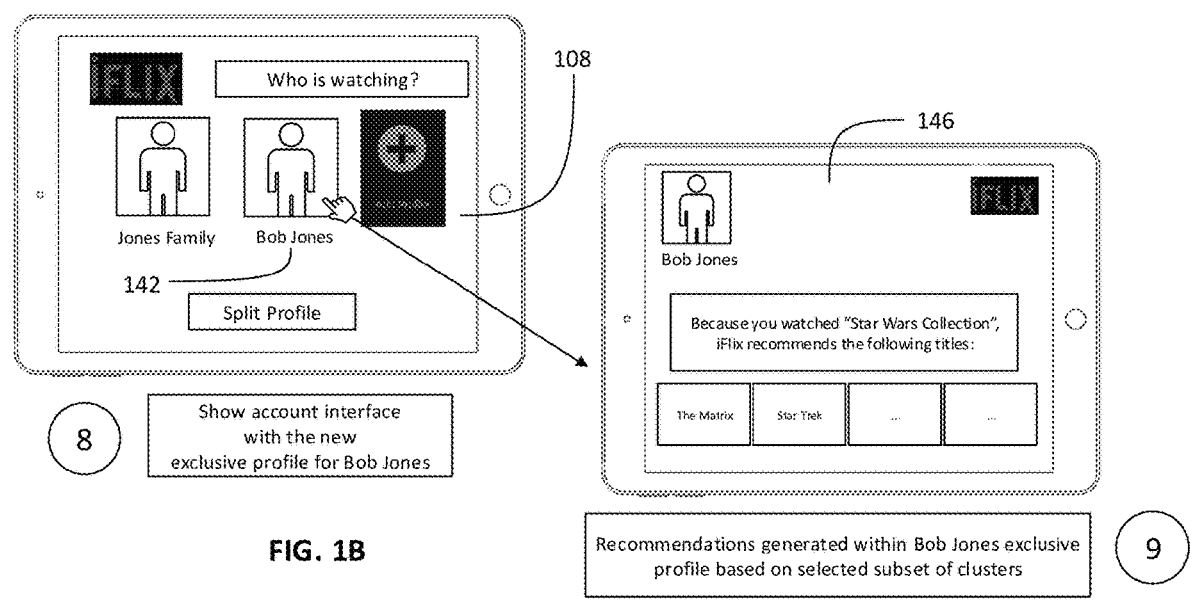

FIGS. 1A and 1B depict examples of splitting a profile associated with an account of a media content system, in accordance with embodiments of the disclosure.

In some embodiments, media content systems provide access to media content via a device associated with an account. A media content system often requires users to create accounts prior to accessing media content to facilitate user identification, billing, data organization, security, and device synchronization, among other suitable functions. In some cases, the media content system requires the user to enter credentials (e.g., username/password) to authenticate access to the account. While the examples of FIGS. 1A and 1B refer specifically to an account of a media content system, it should be appreciated that the present disclosure is applicable to any suitable account, such as, for example, an account of an electronic commerce platform, an account of a banking service provider, an account of a social media platform, or an account of any other suitable service provider or platform.

As shown in FIG. 1A, an account of media content system 104 (e.g., an account of iFlix video streaming system) associated with the Jones family is logged in to device 102. For example, credentials (e.g., a username/password) corresponding to the account of media content system 104 are entered by a member of the Jones family on device 102 in order to authenticate access to the account. In some embodiments, a media content application is executed using one or more computing devices of media content system 104. For example, the media content application (e.g., a desktop or mobile application of iFlix) may be executed in full or in part on user equipment 102 (e.g., as an installed app or via browser) and/or at one or more remote servers 114 (e.g. for execution of back-end services for the iFlix video streaming) and/or at or distributed across any of one or more other suitable computing devices, in communication over any suitable number and/or types of suitable networks (e.g., the Internet, cellular networks, etc.). For example, user equipment 102 may be one or more of user equipment 1007, 1008, 1010 of FIG. 10. One or more remote servers 114 may be server 1004 of FIG. 10. The user equipment 102 and one or more remote servers 114 may communicate over communication network 1009 of FIG. 10.

In some embodiments, steps of this example are performed by the media content application. In some implementations, a media content application is an application designed to deliver content to user equipment, such as an app installed on a mobile device, smart TV, set-top box, streaming media player, or a website accessed from a user's computer via a browser. In some embodiments, the media content application is a stand-alone application, or is incorporated as part of any suitable application, e.g., one or more broadcast content provider applications, broadband provider applications, live content provider applications, media asset provider applications, XR applications, video or image or electronic communication applications, social networking applications, image or video capturing and/or editing applications, or any other suitable application(s), or any combination thereof. In some embodiments, the media content application is installed at or otherwise provided (e.g., via a browser) to a particular computing device, may be provided via an application programming interface (API), or may be provided as an add-on application to another platform or application. In some embodiments, suitable software tools (e.g., one or more software development kits, or SDKs) may be provided to any suitable party, to enable the party to implement the functionalities described herein.

In some approaches, the media content application provides a user interface for browsing through available content (e.g., videos, audio, XR content that may be streamed to user equipment 102 from one or more remote servers 114). When the media content application receives a selection of a content item from user equipment 102, the media content application communicates with remote servers 114 to retrieve the requested content item along with metadata corresponding to the content item. The remote servers 114, in some implementations, store information related to device 102 or to the user account used to access the media content application. In some embodiments, remote servers 114 store data related to user interactions and navigation behavior associated with use of the media content application.

In some approaches, media content system 104 causes device 102 to generate for display a user interface 108 on a user input interface (e.g., user input interface 910) requesting input identifying an existing profile or prompting creation of a new profile. In some embodiments, media content system 104 presents user interface 108 in response to authentication of a login to the account. In other embodiments, media content system 104 presents user interface 108 within a profile management menu, upon receiving a request to view or set preferences for the profiles associated with a given account. User interface 108, in some implementations, includes an identifier associated with each existing profile associated with the account, such as a name (e.g., "Jones Family") and/or an image corresponding to the existing profile. In some cases, media content system 104 displays media content identifiers and recommendations corresponding to the existing profile upon receiving a selection of an identifier associated with the existing profile. In some implementations, user interface 108 may include an option to delete an existing profile, rename an existing profile, or move an existing profile to another account.

In some embodiments, user interface 108 also includes a user-selectable option 101 to create a new profile. In some approaches, a new profile is created either from scratch, in which case the new profile is created with an empty media consumption history, or from an existing profile. As such, in some embodiments, in addition to the option to add a new profile, user interface 108 also includes a user-selectable option 110 to create a new profile by splitting an existing profile, such as profile 106. In some examples, the account does not include any associated profiles, and all the consumption data corresponding to the account is stored without distinction between individual profiles; as such, in some implementations, the media content system presents the option to create a new profile based on the consumption history of the account as a whole. In some embodiments, user interface 108 includes an individual user-selectable option corresponding to each existing profile, such that a selection of the user-selectable option corresponding to a given profile results in a split of the given profile. In other embodiments, user interface 108 includes a single user-selectable option corresponding to all the existing profiles, such that a selection of the single user-selectable option prompts the media content system to request input identifying an existing profile to split. In some approaches, the media content system receives, via user interface 108, user input indicating a name (e.g., Bob Jones) for the new profile that will result from the split.

In some embodiments, each profile within an account of a media content provider comprises consumption data for a plurality of content items. For example, the "Jones Family" profile 106 comprises consumption data 112, which includes a respective content item identifier and a date and time at which the respective content item was consumed. In some embodiments, the consumption data includes additional data such as user interactions with the respective content item (e.g., liking/disliking the content item, sharing the content item, or commenting on the content item); viewing progress points corresponding to the respective content item; technical details related to the playing of the respective content item (e.g., quality settings, device information, subtitles, language selection or network connection details); or navigation behavior related to consumption of the content item.

As referred to herein, the terms "media asset" and "content item" may be understood to mean electronically consumable user assets, such as 3D content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other suitable media or multimedia and/or combination of the same. Content may be recorded, played, transmitted to, processed, displayed and/or accessed by user equipment, and/or can be part of a live transmission.

In response to receiving a command to create a new profile by splitting existing profile 106, in some implementations, media content system 104 accesses, from server 114, consumption data 112 associated with the existing profile 106. In some approaches, media content system 104 accesses consumption data 112 from a database locally. Alternatively, media content system 104 may also access consumption data 112 from a server of a third-party service provider.

In some embodiments, media content system 104 uses consumption data 112 to extract clusters corresponding to consumption patterns within the profile's consumption history. In some implementations, each content item available for consumption from media content system 104 is associated with respective metadata, which includes a characterization of the content item based on a plurality of content properties. In some approaches, the content properties correspond to genres of content, while in in other implementations, the content properties correspond to categories that could be used to describe the content item (e.g., "superheroes," "cats," "dogs," "romance," "action," "aliens", among other content properties). In some embodiments, media content system 104 accesses a content property vector corresponding to each content item, where each individual component of the content property vector corresponding to the content item is a weight which describes how relevant the content item is to the given content property. For example, media content system 104 has content properties ("comedy," "drama," "horror," "70's," "romance," "cats"), and assigns each content item a score between 0 and 1 for each content property such that a score of 0 indicates that the content item is not relevant to the respective content property at all and a score of 1 indicates that the content item is extremely relevant to the respective content property. As another example, if media content system 104 assigns to the content item "Titanic" a corresponding vector of (0.3, 0.9, 0.0, 0.0, 0.9, 0.0), given that the corresponding content properties are ("comedy," "drama," "horror," "70's," "romance," "cats"), media content system 104 determines that "Titanic" is slightly relevant to the content property "comedy," highly relevant to the content property 'drama,' and not at all relevant to the content property "horror."

In some approaches, the content property vectors corresponding to each content item are automatically generated using machine learning algorithms and tools, while in other approaches, the content property vectors corresponding to each content item are created by human reviewers who manually assign a value for each component based on the content item's relevance to the content property. In some approaches, media content system 104 stores the generated content property vectors in server 114, and as such, accesses the content properties and/or the content property vectors corresponding to each content item in the consumption history of profile 106, from server 114. In some approaches, media content system 104 stores the content properties and/or the content property vectors corresponding to each content item locally in a database within media content system 104. Alternatively, media content system 104 may store the content properties and/or the content property vectors corresponding to each content item in a server of a third-party service provider.

In some approaches, the score assigned to each content item for each respective content property is, rather than a value between 0 and 1, a discrete value between some lower and upper bounds, or any other suitable score. In some implementations, the number of content properties, or the dimensionality of the content property vector assigned to each content item, is far greater than the dimension of six used in the above example (e.g., 50, 100, 1000, or any suitable number). In some embodiments, the media content system appends a date/time component to the content property vector corresponding to a content item, in order to group content items that might be viewed around the same time every day or the same day of the week. In some implementations, the media content system may generate a single component to represent the date and time of consumption, while in other implementations, the media content system may instead generate multiple components to represent the date and time. In some approaches, the media content system adds other metrics to the content property vector corresponding to each content item, such as a user's navigation behavior, a clickthrough rate, a subtitle preference, a language selection, or a speed at which the user performs a particular action, among other suitable metrics.

As shown in FIG. 1B, in some embodiments, media content system 104 extracts clusters 124, 126, and 128 corresponding to consumption patterns within the profile's consumption history by grouping content items based on proximity. In some implementations, media content system 104 uses the content property vectors corresponding to each content item within the consumption history of profile 106 to extract clusters of similar consumption. For example, each content item shown within clusters 124, 126, and 128 corresponds to content items within the consumption history of profile 106. Each cluster represents content items that are similar to one another, as determined by the proximity of the content property vectors corresponding to each of them. For example, "Sleepless in Seattle" and "When Harry Met Sally" have similar content properties, and as such, the content property vector corresponding to "Sleepless in Seattle" is close in proximity to the content property vector corresponding to "When Harry Met Sally." As a result, "When Harry Met Sally" and "Sleepless in Seattle" are both grouped into cluster 126. While the clusters 124, 126, and 128 are shown as two-dimensional circles for illustrative purposes, it must be noted that this is a simplification of the clustering process and that, in many embodiments, the clusters extend into multiple dimensions. In some examples, the clusters are hyperspheres, while in other examples, the clusters do not follow any particular geometric shape and are instead regions with arbitrary boundaries in an n-dimensional space.

In some approaches, media content system 104 determines similarities between content items by determining Euclidean distances between content property vectors corresponding to content items within the profile's consumption history. For example, if the movie "Justice League" has corresponding content property vector (1.0, 0.0, 0.0, 0.2, 1.0, 0.9), and the movie "Jules" has corresponding content property vector (0.0, 0.0, 0.0, 0.3, 0.1, 1.0) for content properties ("super-heroes," "cats," "dogs," "romance," "action," "aliens"), the squared Euclidean distance between the two is 1.83. This squared Euclidean distance serves as a measure of the similarity between the two movies. As another example, if the movie "DC League of Super-Pets" has corresponding content property vector (1.0, 0.4, 1.0, 0.0, 0.9, 0.5) for the same content properties, the squared Euclidean distance between "DC League of Super-Pets" and "Jules" is 3.14, and the squared Euclidean distance between "DC League of Super-Pets" and "Justice League" is 1.37. In this example, the squared Euclidean distances indicate that, of the three movies, "DC League of Super-Pets" is more similar to "Justice League" than it is to "Jules," and that the similarity between "DC League of Super-Pets" and "Justice League" is roughly the same magnitude as the similarity between "Justice League" and "Jules."

In some implementations, media content system 104 determines clusters by determining a center and a radius of a cluster and includes in the cluster any media content item with a squared Euclidean distance from the center of the cluster which is lower than the radius. For example, if media content system 104 determines a center of a particular cluster to be the point (1.0, 0.6, 1.0, 0.0, 0.9, 0.6) and a radius of the cluster to be 2, media content system 104 calculates the squared Euclidean distance of each content item from the center point (1.0, 0.6, 1.0, 0.0, 0.9, 0.6), and includes in the cluster any content items for which the squared Euclidean distance between the content property vector corresponding to the content item and the center of the cluster is less than 2, which is the radius of the cluster. As such, because the squared Euclidean distance between "Jules" and the center of the cluster is 3.25, which is greater than the radius of the cluster, the media content system would not include "Jules" in the cluster. However, since the squared Euclidean distance between the center of the cluster and the content property vector corresponding to "Justice League" and the squared Euclidean distance between the center of the cluster and the content property vector corresponding to "DC League of Super Pets" are 1.5 and 0.05, respectively, both of which are less than the cluster's radius of 2, "Justice League" and "DC League of Super-Pets" are both included in the cluster.

In some embodiments, rather than selecting an arbitrary point as the center of a cluster, the media content system selects the content property vector corresponding to a particular content item as the center of the cluster. For example, the media content system, in some implementations, might designate the content property vector corresponding to "DC League of Super-Pets," which is (1.0, 0.4, 1.0, 0.0, 0.9, 0.5), as the center of a particular cluster, thus including in the cluster any content item for which the squared Euclidean distance between the content property vector corresponding to "DC League of Super-Pets" and the content property vector corresponding to the respective content item is less than a threshold.

In some embodiments, the media content system determines the similarity between the content property vectors using a similarity function other than the squared Euclidean distance, such as a discrete inverse cosine, a Jaccard index, or any other suitable similarity function. In some implementations, media content system 104 may extract clusters from the consumption data using a clustering technique such as K-means clustering, DBSCAN clustering, affinity propagation clustering, or any other suitable method; such clustering techniques determine boundaries that define clusters of points in a hyperspace of variables, each of which, in this case, represents values of a different content property. For example, a k-means clustering algorithm, in order to generate k individual clusters, randomly selects k initial cluster centers and iteratively assigns each data point to the cluster whose center is closest; based on the mean of the assigned points, the model recalculates the cluster centers and repeats the process of assigning data points to clusters and recalculating cluster centers until an optimal partitioning of the dataset is reached (i.e., further iterations do not significantly change the cluster assignments).

In some approaches, media content system 104 causes device 102 to generate for display, on user interface 130, identifiers of each cluster. In some embodiments, media content system 104 also displays on user interface 130, for each cluster, identifiers corresponding to each content item of a set of representative content items. In some implementations, media content system 104 selects the representative content items based on popularity, viewing progress, patterns of consumption, clickthrough rates, distance from a center of the cluster, or any other suitable metric. For example, in some approaches, media content system 104 selects the representative content items for a particular cluster by selecting the content items whose corresponding content property vectors are closest to the center of the particular cluster.

In other implementations, media content system 104 selects the content items with corresponding content property vectors located closest to the periphery of a cluster as the representative content items. In other approaches, media content system 104 selects the representative content items by selecting the most popular content items from each cluster. In some embodiments, media content system 104 selects the representative content items by selecting the content items from the consumption history of profile 106 that fall within the respective cluster. In some approaches, media content system 104 selects the content items from a respective cluster that have been consumed most recently from profile 106 as the representative content items for the respective cluster. In some embodiments, media content system 104 selects the representative content items for a respective cluster based on a viewing progress corresponding to the content items of the respective cluster; for example, media content system 104 may select the content items from a respective cluster that have been partially consumed by profile 106 as the representative content items for that cluster. In some approaches, media content system 104 uses the selection and navigation behavior from profile 106 to select the representative content items for each cluster.

In some implementations, a recommendation engine generates, using a least mean square method or any other suitable method, a list of media items that are closest in proximity to items within the cluster. A recommendation engine may be any program or process for selecting content recommendations.

In some approaches, media content system 104 orders the identifiers corresponding to the representative content items based on a consumption date, displaying the content items that were consumed most recently at the beginning of the list. Media content system 104, in some embodiments, orders the identifiers corresponding to the representative content items based on popularity, viewing progress, patterns of consumption, clickthrough rates, distance from a center of the cluster, or any other suitable metric. Furthermore, in some approaches, the identifiers corresponding to the representative content items are ordered on user interface 130 such that identifiers corresponding to outliers or content items closer to the periphery of a cluster are displayed first, allowing the media content system to refine the cluster when a user elects to remove these content items from the profile selection. In other embodiments, the identifiers corresponding to the representative content items are ordered on user interface 130 such that the identifiers corresponding to content items closer to the center of a cluster are presented first, allowing the media content system to monitor the user's quick selection of content items.

In some approaches, media content system 104 generates for display a single identifier to represent a collection of content items. For example, media content system 104 generates for display identifier 132 which represents the "Star Wars collection," which includes all the "Star Wars" movies and "Star Wars"-related content.

In some implementations, media content system 104 generates for display, on user interface 130, user-selectable option 140 to "Extract More Preferences." If the media content system receives a selection of this option, the media content system, in some embodiments, attempts another clustering process. In some embodiments, the media content system presents user-selectable option 140 to "Generate Fewer Clusters" (not shown), thus relaxing a similarity threshold in order to generate a smaller number of larger, more inclusive clusters. Conversely, in some implementations, the media content system presents user-selectable option 140 to "Extract More Preferences," to allow the media content system to tighten a similarity threshold and as a result, generate a larger number of smaller, less inclusive clusters. In some approaches, media content system 104 allows users to remove content items from the list of representative content items corresponding to a particular cluster. Removal of a content item, in some approaches, prompts media content system 104 to re-run the clustering process in order to account for the removal of the content item.

In some embodiments, media content system 104 generates for display, on user interface 130, user-selectable options 134, 136, and 138 corresponding to each of clusters 124, 126, and 128, respectively. In some approaches, the user-selectable options are clickable areas of the screen, buttons, interactable touchscreen elements, or any other suitable user interface element. In some approaches, when media content system 104 receives selections of one or more user-selectable options, each of which corresponds to a cluster, the media content system adds the one or more clusters that correspond to the selected user-selectable options to the new profile. In some embodiments, the media content system receives a user interface selection of one or more of the user-selectable options, each of which corresponds to a respective cluster. The one or more selected clusters, in some approaches, comprise a subset of the identified clusters, and the media content system adds the selected subset of clusters to the new profile. For example, if the media content system receives selections of user-selectable options 134 and 136 which correspond to clusters 124 and 126, respectively, media content system 104 creates a new profile 142 and adds clusters 124 and 126 to new profile 142.

In some approaches, after creating new profile 142, media content system 104 generates an identifier corresponding to new profile 142 (e.g., the name 'Bob Jones') and displays the identifier corresponding to the new profile on user interface 108 alongside each of the identifiers that correspond to existing profiles (e.g., 'Jones Family') within the account. In some implementations, selection of the identifier corresponding to the new profile 142 causes media content system 104 to generate for display a user interface 146 that displays recommendations and content items corresponding to the new profile 142. In some embodiments, media content system computes recommendations based on selected clusters 124 and 126 and provides the computed recommendations to the new profile. For example, because 'Star Wars Collection' was included in cluster 126, which was selected for inclusion in new profile 142, media content system 104 provides recommendations related to 'Star Wars Collection' to the new profile 142.

In some embodiments, media content system 104 automatically transfers to new profile 142, from existing profile 106, consumption history and consumption data corresponding to the selected clusters 124 and 126. In some approaches, the consumption history transferred to new profile 142 is a subset of the consumption data 112, and each entry includes an identifier of the content item, an access date/time, and any additional data corresponding to consumption of the content item. In some implementations, media content system 104 removes from the original profile 106 the consumption history transferred to new profile. In some embodiments, the media content system determines whether to keep any of the selected clusters as preferences of the original profile 106 by evaluating the overlap between the selected clusters and the unselected clusters.

In some approaches, media content system 104 uses the consumption history of new profile 142 to provide recommendations to new profile 142. In some approaches, media content system 104 runs a recommendation engine, which generates, using a least mean square method or any other suitable method, a list of media items that are closest in proximity to items within the cluster. In some embodiments, the recommendation engine selects content to recommend using a collaborative filtering technique, a content-based filtering technique, or any other suitable method. For example, suitable techniques for providing content recommendations are described in U.S. Pat. No. 11,657,080, the contents of which are hereby titled "Methods and Systems for Generating and Presenting Content Recommendations for New Users"; U.S. Pat. No. 11,509,965, the contents of which are hereby titled "Systems and Methods for Providing Content Recommendations"; and patent application Ser. No. 17/678,713, the contents of which are hereby titled "Systems and Methods for Providing Media Content Recommendations."

Figure 2:
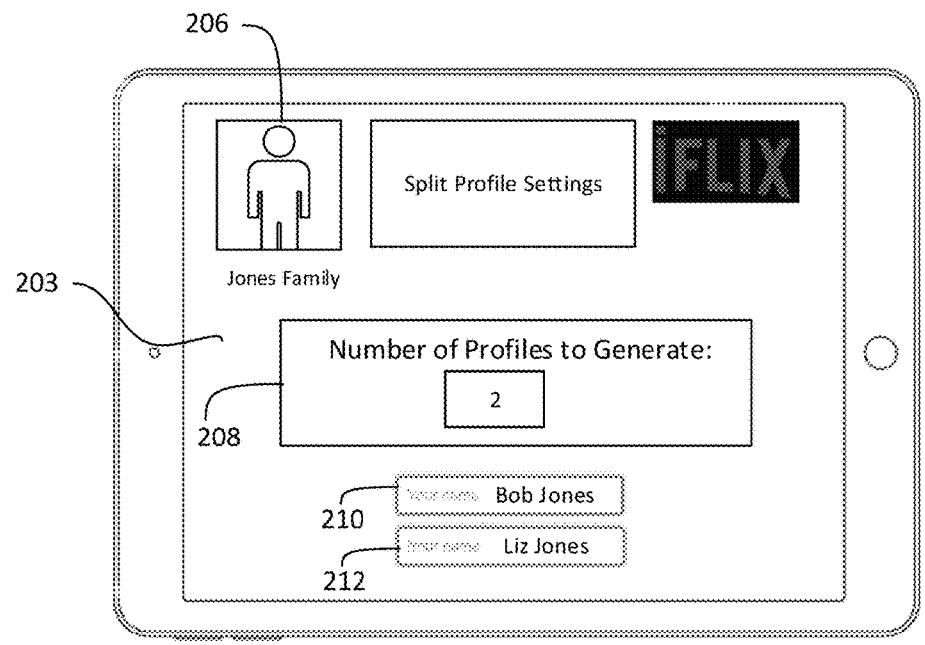
FIG. 2 is a schematic illustration of a user interface for splitting a profile associated with an account of a media content system, in accordance with embodiments of the disclosure.
Figure 2:
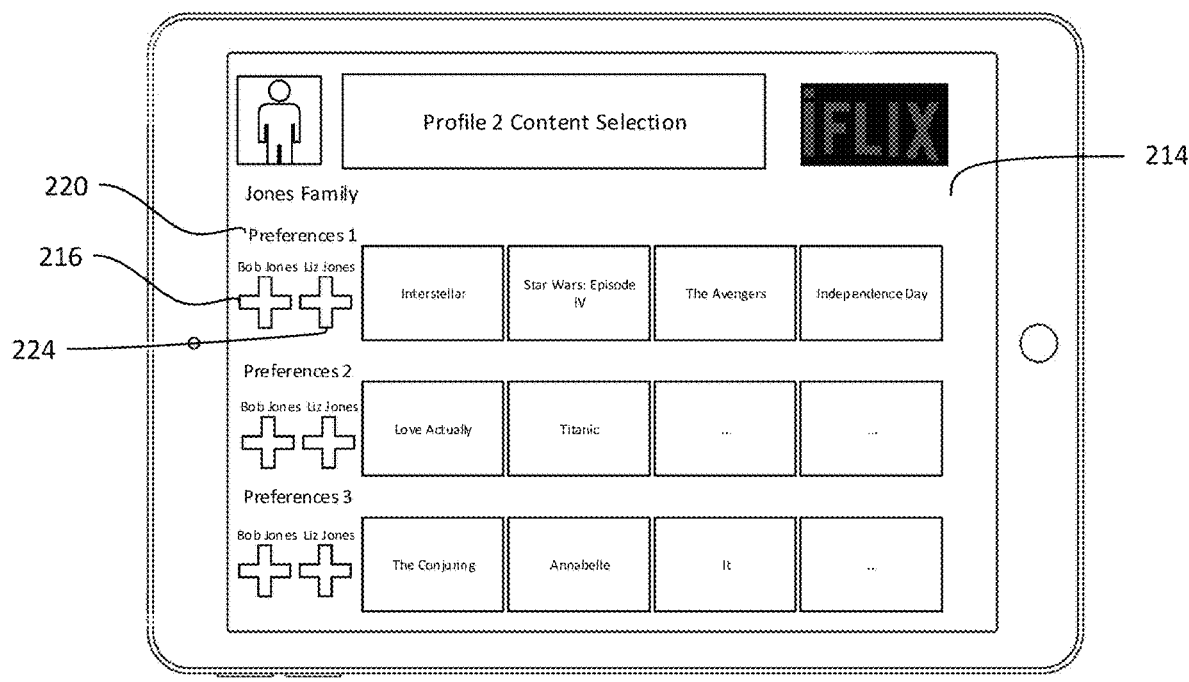

FIG. 2 is a schematic illustration of a user interface for splitting a profile associated with an account of a media content system, in accordance with embodiments of the disclosure. In some embodiments, splitting a cluster as shown in FIG. 2 results in the creation of multiple profiles by media content system 104 when interface 108 of FIG. 1A is displayed.

In the example of FIG. 2, the media content system (for example, system 104 of FIGS. 1A-1B) prompts the user to create a number of new profiles from the "Jones Family" existing profile 206, which corresponds to existing profile 106 of FIGS. 1A-1B. In doing so, the media content system generates for display on a user input interface (e.g., user input interface 910 of FIG. 9) of a user device (e.g., user device 102 of FIGS. 1A-1B) user interface 203, which displays settings corresponding to a split of an existing profile 206. In some embodiments, the media content system generates user interface 203 for display after receiving a selection to split a profile (e.g., after receiving a selection of user-selectable option 110 to 'Split Profile,' as shown in FIG. 1A). In some approaches, the media content system receives, via user interface 203, a user interface input that indicates a number of profiles to generate. The media content system, in some approaches, receives the user interface input via a user-selectable option such as, for example, user-selectable option 208, while in some approaches, the media content system receives the user interface input via an interactable touchscreen element, a text input field, or any other suitable user interface element. In some embodiments, the media content system includes as part of user interface 203 text input fields prompting user input of a name for each of the new profiles that will result from the split such as, for example, text input fields 210 and 212. In such examples, upon receiving a user interface input of the names 'Bob Jones' and 'Liz Jones' from the text input fields, the media content system assigns the names 'Bob Jones' and 'Liz Jones' to each of the new profiles that will result from the split of profile 206.

In some embodiments, the media content system, after receiving a user interface input indicating a number of profiles to create from the split of profile 206, identifies clusters corresponding to the consumption history of profile 206 in order to create one or more new profiles. In some approaches, the clusters are identified based on the techniques described herein, e.g., in relation to cluster identification described in FIGS. 1A-1B. The media content system, in some implementations, causes the user device to generate for display user interface 214, which prompts user interface inputs identifying the clusters to be added to each new profile. In some examples, user interface 214 corresponds to user interface 130 of FIG. 1B. User interface 214, includes, for each profile, a user-selectable option to add a given cluster to the profile. For example, user-selectable options 216 and 224 both correspond to the preference cluster corresponding to the 'Preferences 1' identifier 220. Upon receiving a selection of user-selectable option 216, the media content system adds the preference cluster corresponding to the 'Preferences 1' identifier 220 to the profile titled 'Bob Jones,' and upon receiving a selection of user-selectable option 224, the media content system adds the cluster corresponding to the 'Preferences 1' identifier 220 to the profile titled 'Liz Jones.' In some approaches, the user-selectable options are clickable areas of the screen, buttons, interactable touchscreen elements, or any other suitable user interface element.

Figure 3:
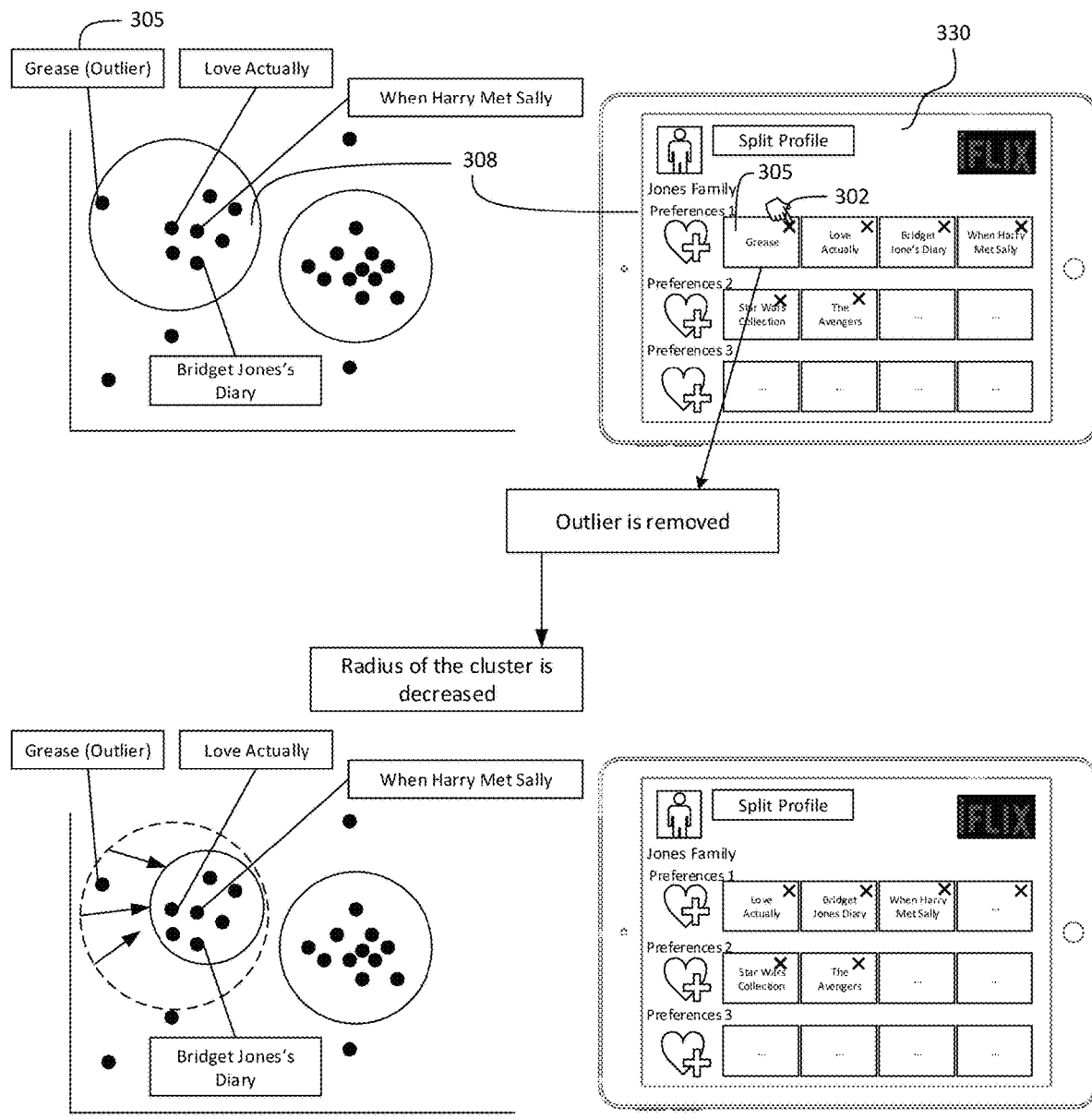
FIG. 3 is a schematic illustration of updating a cluster identified from a profile in response to user input, in accordance with embodiments of the disclosure.

FIG. 3 is a schematic illustration of updating a cluster identified from a profile in response to user interface input, in accordance with embodiments of the disclosure. In some embodiments, updating a cluster based on user interface inputs that indicate an outlier should be removed from a cluster as shown in FIG. 3 is performed by media content system 104 when user interface 130 of FIG. 1B is displayed.

In some embodiments, the media content system identifies one or more outliers within a preference cluster (e.g., clusters 124, 126, and 128 of FIGS. 1A-1B). For example, cluster 308 includes content items "Grease," "Love Actually," "When Harry Met Sally," and "Bridget Jones's Diary." Of these, the content property vectors corresponding to each of "Love Actually," "When Harry Met Sally," and "Bridget Jones's Diary" are all located closer to the center of cluster 308, while the content property vector corresponding to "Grease" is located near the boundary of cluster 308. The media content system thus identifies "Grease" as an outlier due to the location of its corresponding content property vector in relation to the cluster as a whole.

In some approaches, the media content system designates as an outlier any content item that falls within the cluster but is above a threshold distance from a center of the cluster. As such, if the center of cluster 308 is the point (1.0, 0.7, 0.9, 0.0, 0.1, 0.1), and both "Bridget Jones's Diary" and "Grease" are part of cluster 308, the media content system determines the distance between the content property vector corresponding to "Grease" and the center of the cluster and compares it to the distance between the content property vector corresponding to "Bridget Jones's Diary" and the center of the cluster. So, if the content property vector corresponding to "Grease" is (0.0, 0.0, 0.2, 0.8, 0.3, 0.5) while the content property vector corresponding to "Bridget Jones's Diary" is (1.0, 0.6, 0.5, 0.5, 0.3, 0.9), the Euclidean distance between the content property vector corresponding to "Grease" and the center of the cluster is 1.679, and the Euclidean distance between the content property vector corresponding to "Bridget Jones's Diary" and the center of the cluster is 1.049.

The media content system, in some approaches, retrieves a threshold distance such that any content item within a cluster with a corresponding content property vector above the threshold distance from the center of the cluster is identified as an outlier. Thus, at a threshold distance of 1.5, "Bridget Jones's Diary" is not identified as an outlier since the distance between its corresponding content property vector and the center of the cluster is 1.049, which is less than the threshold of 1.5. Conversely, "Grease" is identified as an outlier at a threshold distance of 1.5 since the distance between its corresponding content property vector and the center of the cluster is 1.679 is greater than the threshold distance of 1.5. In other implementations, the media content system identifies outliers based on the distance of their corresponding content property vectors from neighboring points within the cluster, the local density of a region that the outlier's corresponding content property vector falls within, a z-score of the content item, or any other suitable method.

In some implementations, the media content system includes one or more identified outliers within the representative content items selected for a particular cluster and displays an identifier corresponding to the outlier on user interface 330, which is displayed on a user input interface (e.g., user input interface 910) of a device (e.g., device 102), along with identifiers for the other representative content items corresponding to the cluster. As an example, the media content system displays, as part of the identifiers of representative content items corresponding to preference cluster 308, an identifier corresponding to outlier 305 (e.g., "Grease") along with identifiers for other non-outliers with corresponding content property vectors closer to the center of the cluster (e.g., "Bridget Jones's Diary"). In some embodiments, the media content system orders the representative content items selected for a particular cluster such that the outliers are displayed first.

In some approaches, the media content system displays, on a user interface (e.g., user interface 330) a user-selectable option (e.g., user-selectable option 302) to remove a content item from a cluster. For example, user interface 330 includes a user-selectable option 302, such as an "x" symbol overlaid over identifier "Grease," to remove "Grease" from preference cluster 308. In some implementations, user interface 330 corresponds to user interface 130 of FIG. 1B and user interface 214 of FIG. 2. In some embodiments, upon receiving a selection of user-selectable option 302, the media content system removes "Grease" from cluster 308, and in some implementations, the media content system also re-runs the clustering process to account for the exclusion of content item 305. In some approaches, the media content system does not, on user interface 330, distinguish between outliers and non-outliers. In some embodiments, if the media content system does not receive a selection of the user-selectable option to remove the content item from the cluster, the media content system does not update the preference cluster unless other user interface inputs to further modify the clusters are received.

In some approaches, the media content system decreases a radius of preference cluster 308 and updates preference cluster 308 based on the decreased radius. In some embodiments, the media content system tightens a criterion of the clustering algorithm used to identify the cluster such that an average radius of the cluster decreases. For example, if the average radius of cluster 308 prior to the removal of "Grease" was 0.6, the media content system may tighten a criterion of cluster 308 such that the new average radius of cluster 308 after the removal of "Grease" is 0.4. Thus, the content property vector corresponding to "Grease" falls outside the new boundaries of cluster 308. It must be noted that the example of FIG. 3 simplifies the identified clusters into two-dimensional circular regions for illustration purposes, and that in many embodiments, the clusters extend into n-dimensions and may not necessarily be spherical in nature. Indeed, in some approaches, the boundaries of the identified clusters do not follow any particular geometric shape and are instead regions with arbitrary boundaries in an n-dimensional space.

In some approaches, the media content system re-computes the cluster by removing the excluded content item from the clustering process altogether; and as such, the media content system, in some embodiments, recomputes all the clusters by re-computing the centers of all the clusters based on exclusion of the content item and re-assigning data points to clusters based on their proximity to the newly calculated centers. As an example, in such approaches, the media content system, after removing "Grease" from the clustering process altogether, re-computes the centers of each cluster and re-assigns data points to each of the clusters. So, if the center of cluster 308 was previously at the point (1.0, 0.7, 0.9, 0.0, 0.1, 0.1), the media content system recalculates a new center for cluster 308 based on the removal of "Grease" from the clustering process. The new center of cluster 308 would likely be closer in distance to the remaining, non-outlier content items previously included in cluster 308, such as "Bridget Jones's Diary," "Love Actually," and "When Harry Met Sally."

In some implementations, the media content system determines the center of a cluster based on an average of the weights corresponding to the remaining items in the cluster, and as such, removal of a content item from a preference cluster, in some examples, causes the media content system to shift the center of the cluster. For example, if the weights corresponding to "Love Actually," "When Harry Met Sally," and "Bridget Jones's Diary are (0.9, 0.8, 0.6, 0.7, 0.2, 1.0), (0.8, 0.8, 0.3, 0.6, 0.6, 0.8), and (1.0, 0.6, 0.5, 0.5, 0.3, 0.9), respectively, the media content system averages the weights corresponding to these items in computing the center of the cluster, which shifts the center of the cluster from the point (1.0, 0.7, 0.9, 0.0, 0.1, 0.1) to the point (0.9, 0.7, 0.5, 0.6, 0.4, 0.9). In some examples, shifting the center of the cluster as such shifts the distribution of content properties within the cluster, which, in some cases, causes the media content system to emphasize certain content items within the cluster while de-emphasizing other content items within the cluster. For example, if prior to the removal of "Grease" the media content system emphasized musicals heavily while de-emphasizing more dramatic content items within cluster 308, the media content system might, after the removal of "Grease," de-emphasize musicals while emphasizing drama more heavily within cluster 308.

The media content system, in some embodiments, displays representative content items corresponding to the updated cluster on user interface 330, in order to prompt further user inputs to refine the identified clusters and/or to select clusters for inclusion in the new profile that will result from the split. In some approaches, after cluster 308 is updated, the media content system selects one or more new representative content items to display on user interface 330 which better represent the emphasis of the updated cluster. So, as an example, if cluster 308 is regenerated to emphasize romantic comedies that are dramatic but not musicals, the media content system might select "Sleepless in Seattle" as a new representative content item for cluster 308. In some approaches, the media content system identifies a new set of outliers corresponding to the updated clusters. In some approaches, the media content system selects an outlier corresponding to the updated cluster from the new set of outliers as a representative content item for the updated cluster and displays an identifier corresponding to the outlier on user interface 330. The media content system, in some approaches, displays, for each representative content item of the one or more updated clusters, a user-selectable option (e.g., user selectable option 302) to remove a content item from the cluster. Receiving yet another user input to remove an outlier causes the media content system to repeat the process, and in some approaches, the media content system is able to repeat the process until a lower limit is reached with regard to cluster size. As an example, the media content system might be able to decrease the size of clusters based on the removal of content items until a cluster reaches an average radius of 0.05.

In some embodiments, the media content system is unable to assign all the content items from the consumption data (e.g., consumption data 112 of FIGS. 1A-1B) of the original profile (e.g., profile 106 of FIGS. 1A-1B) to clusters via the clustering process, e.g., the clustering process described in relations to FIGS. 1A and 1B. In some examples, the remaining content items that are not associated with any clusters are identified as outliers. In some approaches, the media content system tests these outliers by displaying an identifier corresponding to the outlier with the representative content items selected for a particular cluster. In some approaches, if the media content system receives a user interface input to remove the outlier, the media content system determines that the user is not interested in the outlier and thus excludes it from the new profile resulting from the split. In some implementations, if the media content system does not receive a user interface input to remove the outlier, the media content system updates the cluster to include the outlier. In some embodiments, the media content system updates the cluster to include the outlier by loosening a criterion of the clustering algorithm such that on average, the radius of the cluster increases.

Figure 4:
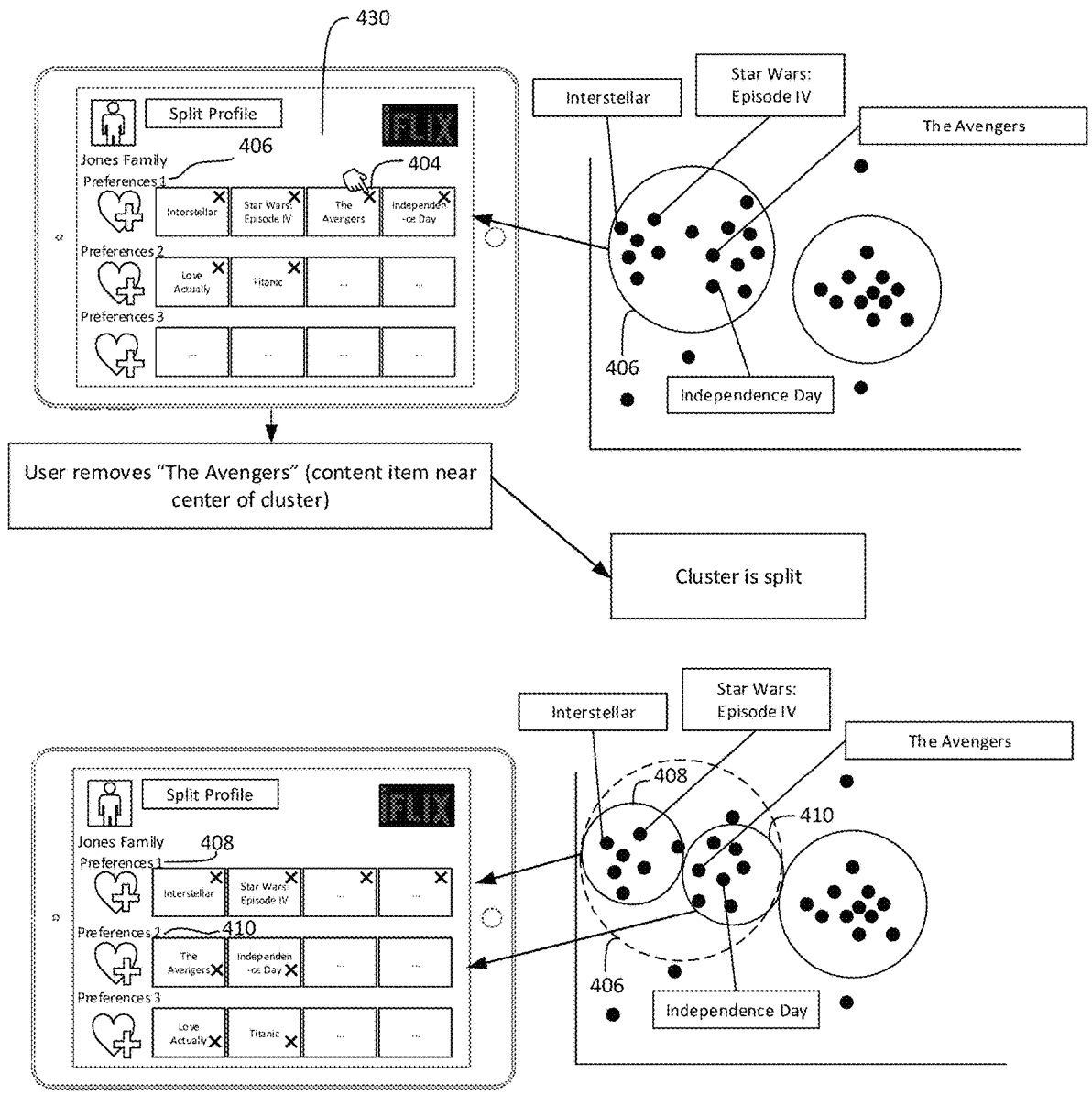
FIG. 4 is a schematic illustration of splitting a cluster identified from a profile in response to user input, in accordance with embodiments of the disclosure.

FIG. 4 is a schematic illustration of splitting a cluster identified from a profile in response to user input, in accordance with embodiments of the disclosure. In some embodiments, splitting a cluster as shown in FIG. 4 is performed by system 104 when interface 130 of FIG. 1B is displayed.

In some approaches, the media content system, in order to present the identified clusters and receive user interface inputs refining the identified clusters, causes the user device (e.g., user device 102 of FIGS. 1A-1B) to generate for display on a user input interface (e.g., user input interface 910) user interface 430, which, in some examples, corresponds to user interface 130 of FIG. 1B, user interface 214 of FIG. 2, and user interface 330 of FIG. 3. In some approaches, the media content system displays, on user interface 430, the user-selectable option to remove a content item from the cluster (e.g., user-selectable option 404) for each representative content item of the one or more clusters (e.g., cluster 406).

In some examples, the media content system (e.g., system 104 of FIGS. 1A-1B) receives a user interface selection removing from a cluster a content item that is not an outlier. For example, the media content system receives a user interface selection of user-selectable option 404, such as an "x" symbol overlaid over identifier "The Avengers" (which, in some examples, corresponds to user-selectable option 302 of FIG. 3) to remove "The Avengers" from cluster 406 (which, in some examples, corresponds to any of clusters 124, 126, or 128 of FIG. 1B, or cluster 305 of FIG. 3). In some examples, the system determines that "The Avengers" is not an outlier. In some approaches, the media content system determines that particular content items are not outliers based on distance-based methods such as Euclidean distance, density-based methods that measure the density of points within the cluster, statistical methods such as z-scores, or any other suitable method. In one example, "The Avengers" may be determined not to be an outlier because the distance of the content property vector of the "The Avengers" is less than a threshold number of standard deviations (e.g., 2 or 3 standard deviations) away from the center of cluster 406. In some approaches, based on this determination, removal of "The Avengers" causes the media content system to split cluster 406 into clusters 408 and 410.

In some approaches, the system determines that a content item is not an outlier using the following example technique. If, as an example, the center of cluster 406 is the point (0.6, 0.4, 0.7, 0.5, 0.8, 0.2), and the content property vector corresponding to "The Avengers" is (0.65, 0.35, 0.75, 0.45, 0.85, 0.25), then the Euclidean distance between the content property vectors is 0.122. In this example, if the average distance of content property vectors from the center of cluster 406 is 1.76 with standard deviation of 0.83, the content property vector of "The Avengers" is within two standard deviations of the average, and the media content system determines that "The Avengers" is not an outlier.

In some approaches, when the media content system receives a user interface selection corresponding to the removal of a content item that is not an outlier, the media content system splits the cluster comprising the content item into two or more sub-clusters such as, for example, clusters 408 and 410, rather than making a cluster smaller or tightening a criterion of the cluster. In some approaches, the other content items that were closer to "The Avengers" than to the center of cluster 406 (e.g., "Independence Day") might form a new cluster altogether, such as, for example, cluster 410. In some embodiments, there are some content items from cluster 406 that, after the removal of "The Avengers," have corresponding content property vectors that are farther away from the content property vector corresponding to the removed content item but closer to a center of some other new or old cluster. For example, the content property vectors corresponding to "Star Wars IV" and "Interstellar" are located farther away from the content property vector corresponding to "The Avengers," but the media content system determines a center of cluster 410 and determines that the content property vectors corresponding to each of "Star Wars IV" and "Interstellar" are closer to the center of cluster 410 than they are to "The Avengers." Based on this determination, the media content system adds "Star Wars IV" and "Interstellar" to cluster 408, rather than to cluster 410, which includes "The Avengers" and "Independence Day."

In some embodiments, after receiving a selection to remove a content item that is not an outlier such as "The Avengers" and splitting a cluster such as cluster 406 into two or more clusters (e.g., clusters 408 and 410), the media content system removes the identifiers corresponding to cluster 406 and its representative content items. In some approaches, the media content system displays on user interface 430 identifiers of each of the two or more newly identified clusters that resulted from the split, along with identifiers of representative content items from each of the clusters, in order to prompt further user inputs to refine the identified clusters and/or to select clusters for inclusion into the new profile that will result from the split. In some approaches, the media content system selects the representative content items for clusters 408 and 410, based on the techniques described herein, e.g., in relation to the representative content item selection described in FIGS. 1A-1B. In some examples, the media content system receives user interface inputs further removing one or more identifiers corresponding to representative content items from cluster 408 or from cluster 410.

Figure 5:
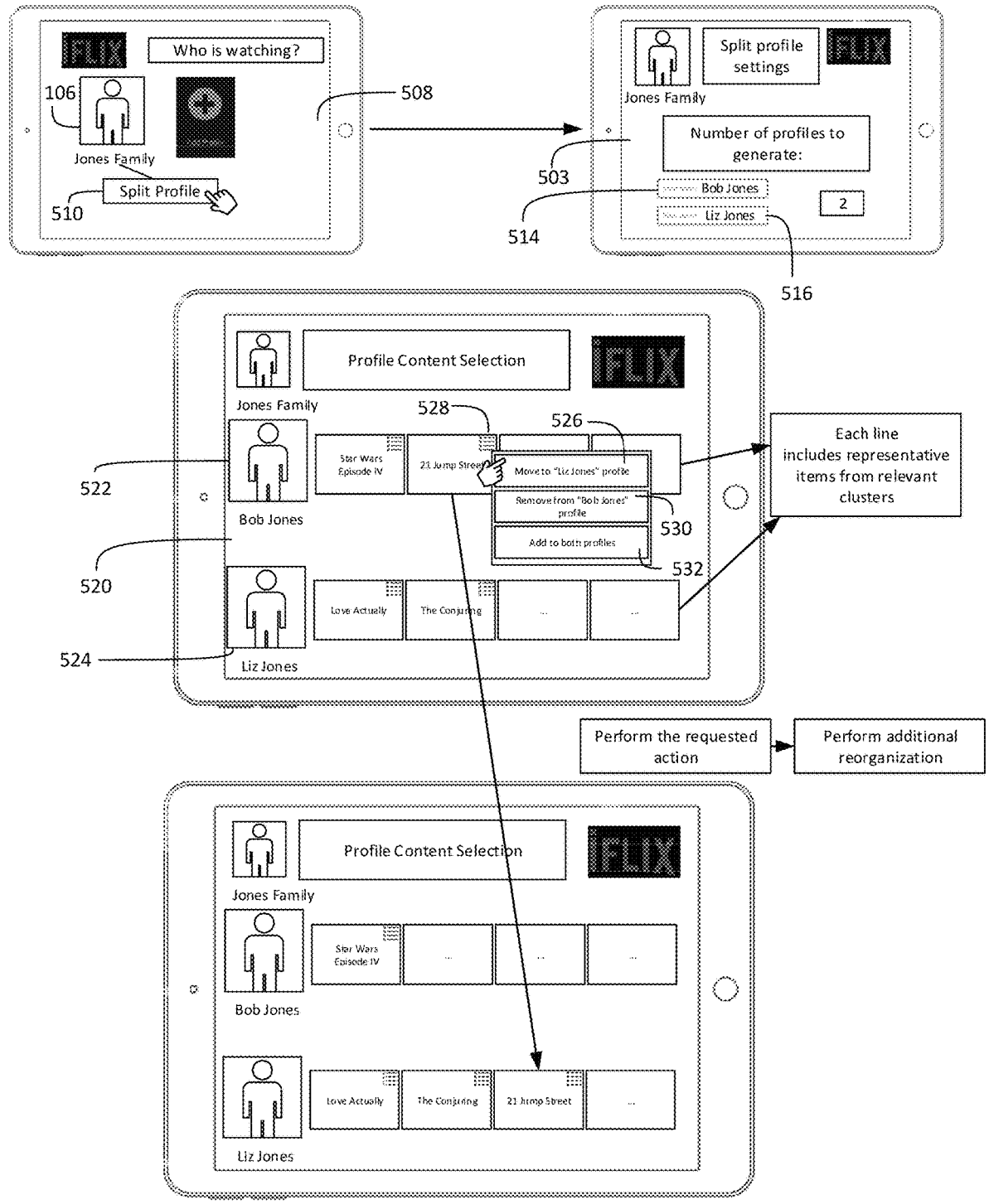
FIG. 5 is a schematic example of a user interface for splitting a profile associated with an account of a media content system, in accordance with embodiments of the disclosure.

FIG. 5 is a schematic example of a user interface for some alternative embodiments for splitting a profile associated with an account of a media content system (e.g., media content system 104 of FIGS. 1A-1B), in accordance with embodiments of the disclosure. In some embodiments, media content system 104 creates numerous profiles at once and assigns the identified clusters to each profile when user interface 130 of FIG. 1B is displayed on a user input interface (e.g., user input interface 910) of a device (e.g., device 102).

In some embodiments, the media content system provides a user-selectable option 510 to split a profile (e.g., profile 106 of FIGS. 1A-1B). In some approaches, user-selectable option 510 corresponds to user-selectable option 110 of FIGS. 1A-1B. The media content system displays user-selectable option 510, in some approaches, on a user interface that requests input identifying an existing profile or prompting creation of a new profile, such as, for example, user interface 108 of FIGS. 1A-1B. Upon receiving a selection of user-selectable option 510 to split the profile corresponding to the "Jones Family," the media content system displays user interface 503, which prompts a user interface selection indicating a number of profiles to create from a split of the "Jones Family" profile. In some embodiments, user interface 503 corresponds to user interface 203 of FIG. 2, and also includes text input fields prompting user input of a name for each of the new profiles that will result from the split such as, for example, text input fields 514 and 516, which correspond to text input fields 210 and 212 of FIG. 2, respectively. For example, the media content system receives a user input indicating that two profiles should be generated from a split of the "Jones Family" profile. The media content, via the text input fields 514 and 516, receives a user input indicating that one of the profiles should be named "Bob Jones," while the other profile should be named "Liz Jones."

Upon receiving user inputs indicating the number of profiles to be generated and a name for each profile, the media content system identifies clusters corresponding to the consumption history of the "Jones Family" profile (e.g., consumption history 112 of FIGS. 1A-1B). In some approaches, the clusters are identified based on the techniques described herein, e.g., in relation to cluster identification described in FIGS. 1A-1B.

The media content system, in some implementations, assigns each of the identified clusters to one or more of the created profiles. For example, the media content system identifies clusters corresponding to "horror," "romantic comedies," "sci-fi," and "thriller comedies," and assigns "horror" and "romantic comedies" to the "Liz Jones" profile, while assigning "sci-fi" and "thriller comedies" to the "Bob Jones" profile.

In some examples, the media content system determines that some of the identified clusters are closer to each other based on the vector distance of the corresponding content items and therefore are more similar to one another. As a result, the media content system assigns them to the same profile. For example, the media content system may identify clusters comprising mostly content items related to "dark comedies," "thriller comedies," and "children's cartoons," and assign the clusters corresponding to "dark comedies" and "thriller comedies" to the same profile due to their similarity, while assigning "children's cartoons" to another profile. While the previous example describes clusters identified as being associated with a particular genre, it should be appreciated that the clusters are not assigned names and may be generated based on other content properties besides genre.

In some approaches, the media content system uses a date/time component or navigation behavior corresponding to each cluster to assign clusters to individual profiles. In other approaches, the media content system uses a combination of factors to assign clusters to profiles. For example, the media content system identifies, from the consumption data of the original profile (e.g., consumption data 112 of FIGS. 1A-1B), that content items from the clusters corresponding to "horror" and "romantic comedies" are consistently viewed late at night, while content items from the clusters corresponding to "thriller comedies" and "sci-fi" are consistently viewed in the afternoon. In some examples, based on this determination, the media content system assigns the clusters corresponding to "horror" and "romantic comedies" to one profile while assigning the clusters corresponding to "thriller comedies" and "sci-fi" to another profile.

In other implementations, the media content system uses a time-based or activity-based clustering process to refine generated clusters in order to eliminate outliers or unclustered content items. For example, the media content system may include at least one datetime component in the content property vector calculation. In some embodiments, the media content system assigns the date/time component a higher weight than the other content property components, such that the date/time component has a greater influence on the results of the clustering process. For example, the date/time component allows the media content system to group content items that are viewed at about the same time every day or the same day of the week. In other embodiments, activity-based components to a content property vector calculation include the way that a user interacts with the media content platform, such as the speed at which the user makes a certain action (e.g., selecting media), or the way that a user navigates from one menu to another. In some embodiments, the media content system iteratively increases the weight of the time-based or activity-based component in the content property vector calculation until no more clusters are generated.

In response to assigning the identified clusters to the two profiles, the media content system selects one or more representative content items to represent each of the identified clusters, based on the techniques described herein, e.g., in relation to the representative content item selection described in FIGS. 1A-1B. In some embodiments, the media content system displays, on user interface 520 (which corresponds to user interface 130 of FIG. 1B) identifiers of the representative content items alongside identifiers of the profiles that will result from the split of the original profile. For example, the media content system selects "Star Wars Episode IV" as a representative content item for the "sci-fi" cluster and displays an identifier corresponding to "Star Wars Episode IV" in line with the identifier corresponding to the "Bob Jones" profile, since the "sci-fi" cluster was assigned to the "Bob Jones" profile. Similarly, the media content system selects "Love Actually" as a representative content item for the "romantic comedy" cluster and displays an identifier corresponding to "Love Actually" in line with the identifier corresponding to the "Liz Jones" profile, since the "romantic comedy" cluster was assigned to the "Liz Jones" profile.

In some implementations, the media content system prompts user interface inputs that instruct the media content system to refine the identified profiles via user interface 520. In some embodiments, user interface 520 includes, for each representative content item, a menu 528 (for example, the four lines overlaid onto the upper right corner of the "21 Jump Street" identifier) that includes within it options 526, 530, and 532. Options 526, 530, and 532 allow the media content system to receive user inputs moving a content item between the profiles, removing a content item from a profile, and adding a content item to both profiles, respectively.

In some examples, the media content system receives a user interface selection to move a content item from one profile to another. For example, the media content system receives a user interface selection of option 526 to move "21 Jump Street" from the "Bob Jones" profile to the "Liz Jones" profile. As a further example, the media content system receives a user interface selection to drag the identifier corresponding to "21 Jump Street" from the "Bob Jones" profile and drop the identifier in the portion of the user interface corresponding to the "Liz Jones" profile. In some approaches, in response to receiving the user interface selection, the media content system moves the entire "thriller comedy" cluster, which "21 Jump Street" is a representative content item for, from the "Bob Jones" profile to the "Liz Jones" profile. The media content system, in some embodiments, adds consumption data corresponding to "21 Jump Street" as well as content items with metadata similar to "21 Jump Street" to the "Liz Jones" profile.

In some implementations, the media content system receives a user interface selection to remove a content item from a profile. For example, the media content system may receive a user interface selection of option 530 to remove "21 Jump Street" from the "Bob Jones" profile. In some approaches, in response to receiving the user interface selection, the media content system removes the entire "thriller comedy" cluster, which "21 Jump Street" is a representative content item for, from the "Bob Jones" profile.

In some approaches, the media content system receives a user interface selection of option 532 to add a content item, such as for example "21 Jump Street," to both profiles. For example, "21 Jump Street" is already included in the "Bob Jones" profile but is not included in the "Liz Jones" profile. The media content system, in response to receiving the user interface selection, adds the "thriller comedy" cluster corresponding to "21 Jump Street" to the "Liz Jones" profile. The media content system, in some embodiments, adds consumption data corresponding to "21 Jump Street" as well as content items with similar metadata to "21 Jump Street" to the "Liz Jones" profile.

Figure 6:
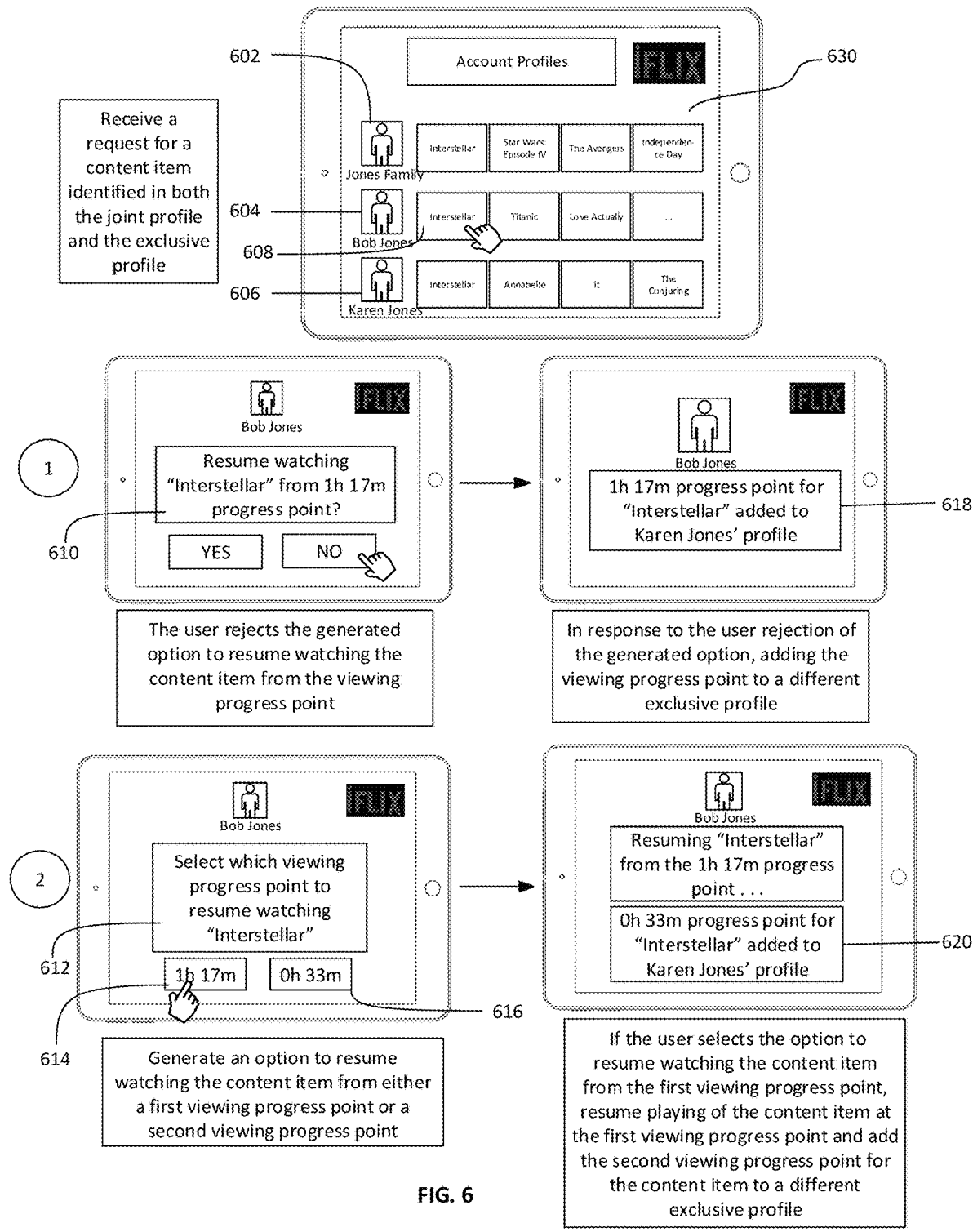
FIG. 6 is a schematic illustration of adding a viewing progress point from a joint profile to an exclusive profile, in accordance with embodiments of the disclosure.

FIG. 6 is a schematic illustration of adding a viewing progress point from a joint profile to an exclusive profile, in accordance with embodiments of the disclosure.

In some embodiments, the media content system (e.g., system 104 of FIGS. 1A-1B) causes the user device (e.g., user device 102 of FIGS. 1A-1B) to generate for display on a user input interface (e.g., user input interface 910 of FIG. 9) user interface 630, which in some examples, corresponds to user interface 130 of FIG. 1B, user interface 214 of FIG. 2, user interface 330 of FIG. 3, user interface 430 of FIG. 4, and user interface 520 of FIG. 5. In some examples, a joint profile (e.g., joint profile 602) comprises consumption data (e.g., consumption data 112 of FIG. 1A) corresponding to multiple users, and an exclusive profile created from a split of the joint profile comprises consumption data corresponding to a single user. In some examples, joint profile 602 comprises consumption data prior to splitting joint profile 602 into a first exclusive profile 604 and one or more second exclusive profiles 606. The consumption data associated with a respective content item 608 includes the viewing progress points of any user who consumed the respective content item 608 while operating joint profile 602, among other data.

As a result, if more than one user begins to consume the same respective content item 608 in joint profile 602, the consumption data associated with the respective content item 608 will, in some examples, contain more than one viewing progress point, with each viewing progress point corresponding to the consumption of one user. In some embodiments, the respective content item 608 from joint profile 602 is presented as a recommendation in both the first exclusive profile 604 and the one or more second exclusive profiles 606 after joint profile 602 is split into the exclusive profiles 604 and 606. After the split occurs (e.g., in any manner as shown in FIGS. 1A-4), the media content system separates each viewing progress point associated with the respective content item 608 by generating user-selectable prompts 610 and 612. In other examples, the respective content item 608 of joint profile 602 contains one viewing progress point, but the media content system must nonetheless determine to which exclusive profile the viewing progress point belongs. The user responses to the prompts indicate to the media content system which viewing progress point belongs to each exclusive profile.

For example, the media content system receives, via user equipment (e.g., user equipment 102 of FIG. 1A), a user interface input to request respective content item 608 identified by joint profile 602. Respective content item 608 (e.g., 'Interstellar') was partially consumed by one user and contains the consumption data (i.e., viewing progress points) of a user who accessed the content item in joint profile 602. The media content system identifies the viewing progress point associated with respective content item 608 and generates user-selectable prompt 610 to determine if the viewing progress point is associated with the requesting user of exclusive profile 604 or a different user of the one or more second exclusive profiles 606. User-selectable prompt 610 will ask the requesting user, in the form of a "yes" or "no" question, if the requesting user would like to resume consumption of respective content item 608 at the viewing progress point (e.g., by asking 'Resume watching "Interstellar" from 1 h 17 m progress point (of full length 3 h 20 m)?'). A user interface selection of the "yes" option indicates to the media content system that the viewing progress point is, in fact, associated with the consumption of respective content item 608 by the requesting user. In response to a user interface selection of the "yes" option, the media content system retrieves respective content item 608 and presents it for display on user interface 630 at the viewing progress point, via user equipment. A user interface selection of the "no" option indicates to the media content system that the viewing progress point is not associated with the consumption of respective content item 608 by the requesting user. In response to receiving a user interface selection of the "no" option, the media content system, via user interface 630, presents message 618 stating that the viewing progress point (i.e., consumption data) has been added to the one or more second exclusive profiles 606. In some embodiments, in response to receiving a user interface selection of the "no" option, the media content system, via user interface 630, presents a message stating that the viewing progress point (i.e., consumption data) has been added to the joint profile 602.

Alternatively, respective content item 608 in joint profile 602 may be associated with consumption data containing multiple viewing progress points, as it was accessed by more than one user. The media content system identifies all viewing progress points associated with respective content item 608. In response to a user interface input to request respective content item 608 identified by joint profile 602, the media content system generates user-selectable prompt 612 to determine if a particular viewing progress point is associated with the requesting user of exclusive profile 604 or a different user or users of the one or more second exclusive profiles 606. User-selectable prompt 612 presents each identified viewing progress point (e.g., first viewing progress point 614 and second viewing progress point 616) as a user-selectable option and asks the requesting user to select from which viewing progress point to resume consumption of respective content item 608. A user interface selection of the first viewing progress point 614 option indicates to the media content system that first viewing progress point 614 is associated with the consumption of respective content item 608 by the requesting user. In response to the user interface selection the first viewing progress point 614 option, the media content system retrieves respective content item 608 and presents it for display on user interface 630 at first viewing progress point 614, via user equipment. Subsequently, the media content system, via user interface 630, presents message 620 stating that second viewing progress point 616 has been added to the one or more second exclusive profiles 606. In some embodiments, message 620 is presented simultaneously with the retrieval and presentation of respective content item 608. In some approaches, in response to the user interface selection of the first viewing progress point 614 option, the media content system via user interface 630, presents a message stating that second viewing progress point 616 has been added to joint profile 602, rather than to another exclusive profile.

While the example presented in FIG. 6 provides two user-selectable viewing progress options identified for resuming the content, it should be appreciated that user-selectable prompt 612 will provide as a user-selectable option each identified viewing progress point. For example, if the media content system identifies four viewing progress points associated with the same content item, user-selectable prompt 612 will present a selectable option corresponding to each of the four identified viewing progress points.

Figure 7:
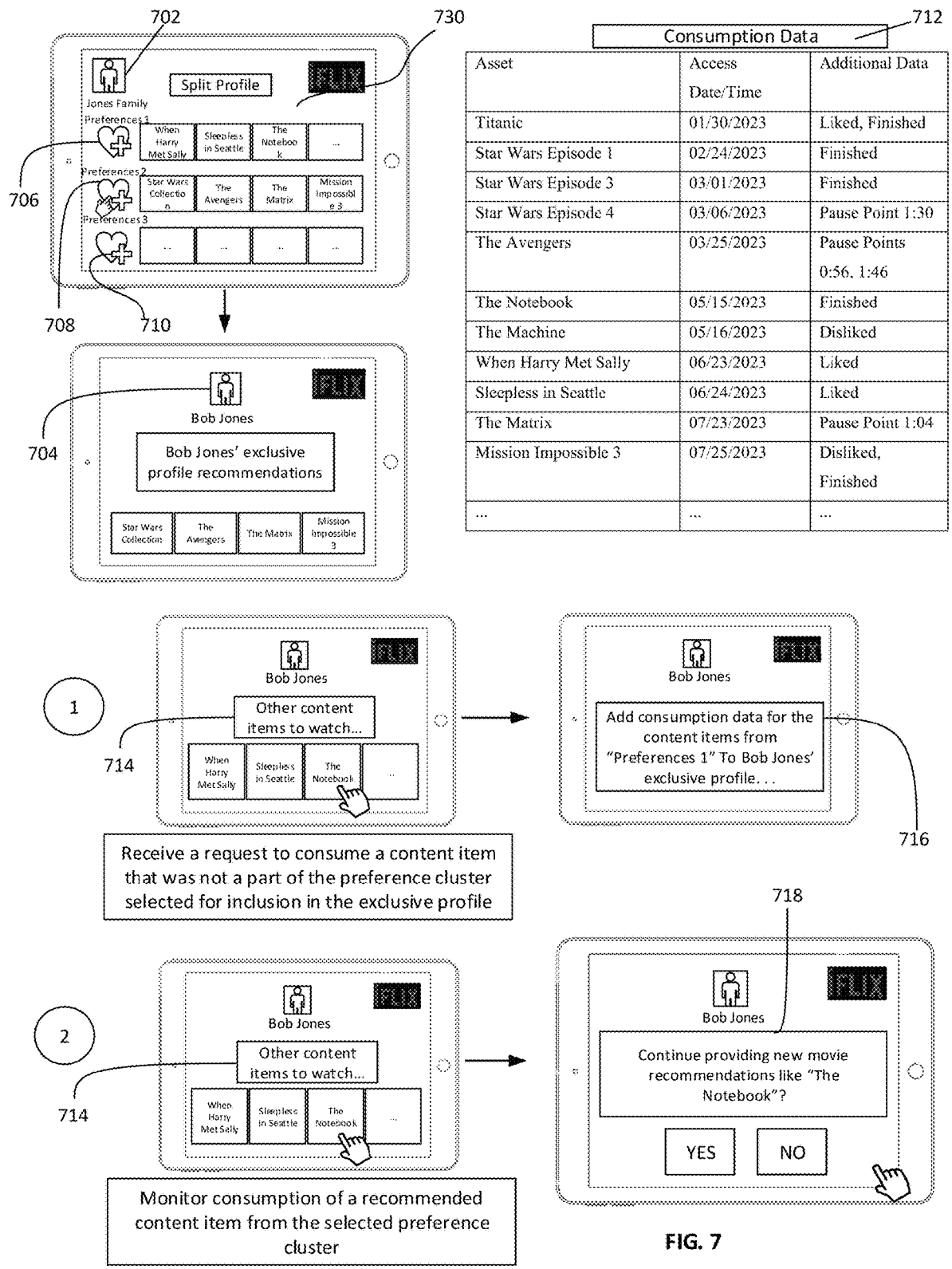
FIG. 7 is a schematic illustration of providing content item recommendations to an exclusive profile based on clusters identified from a joint profile, in accordance with embodiments of the disclosure.

FIG. 7 is a schematic illustration of providing content item recommendations to an exclusive profile based on clusters identified from a joint profile, in accordance with embodiments of the disclosure.

Figure 9:
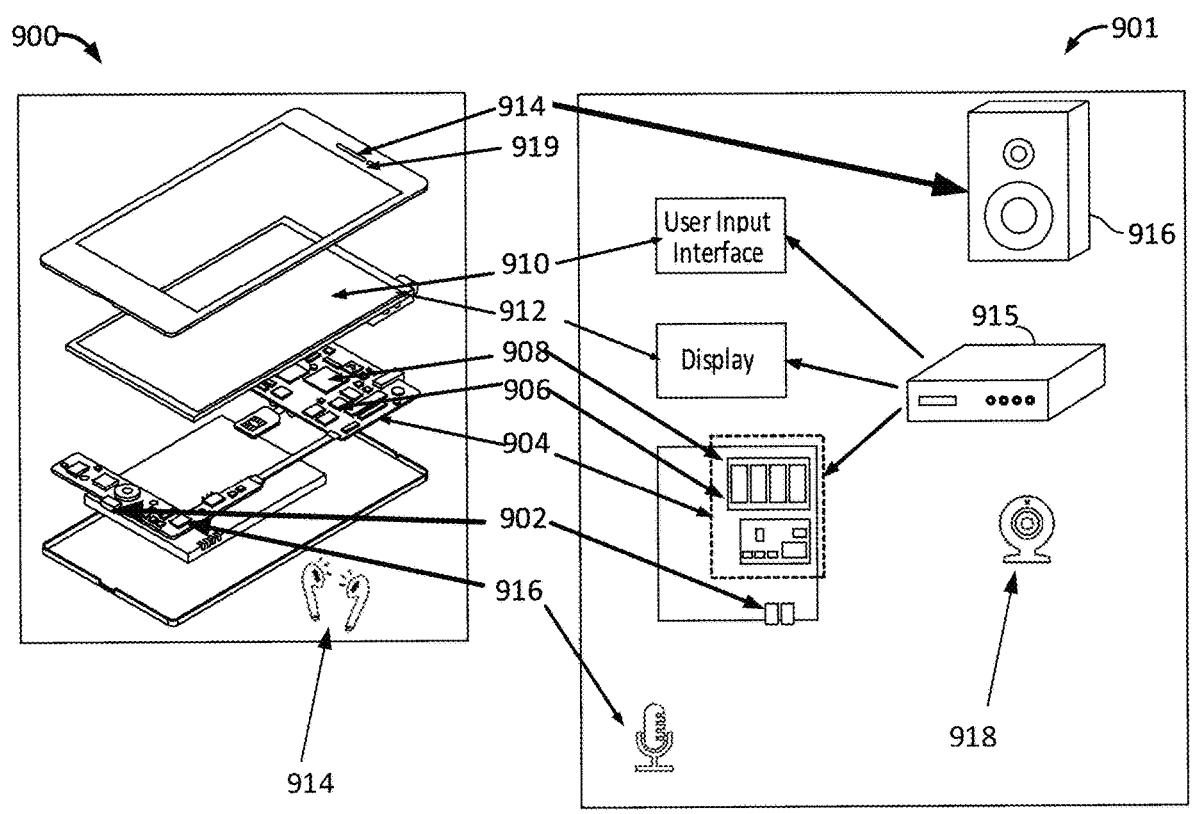
FIG. 9 shows illustrative devices and systems for splitting a profile associated with an account of a media content system, in accordance with some embodiments of this disclosure.

In some embodiments, the media content system (e.g., system 104 of FIGS. 1A-1B) causes the user device (e.g., user device 102 of FIGS. 1A-1B) to generate for display on a user input interface (e.g., user input interface 910 of FIG. 9) user interface 730, which in some examples, corresponds to user interface 130 of FIG. 1B, user interface 214 of FIG. 2, user interface 330 of FIG. 3, user interface 430 of FIG. 4, user interface 630 of FIG. 6 and user input interface 910 of FIG. 9. In some examples, joint profile 702 comprises consumption data 712 (e.g., consumption data 112 of FIG. 1A) prior to splitting joint profile 702 into an exclusive profile 704 and one or more other exclusive profiles. Respective portions of consumption data 712 are associated with each content item identifier of preferences 706, 708 and 710, that correspond to the content items contained in each of the clusters (e.g., generated in any manner as shown in FIGS. 1B, 3 and 4). The media content system provides content recommendations based on which preferences (that correspond to clusters of grouped content items) are selected to be included in the exclusive profile.

In some embodiments, the media content system receives a user interface selection from the user (e.g., Bob Jones) to create exclusive profile 704 by selecting preferences 708 from user interface 730, which correspond to content items grouped into a cluster. In some embodiments, the media content system further refines the preferences, recommendations and consumption data associated with exclusive profile 704 by adding consumption data associated with clusters of content items that were not initially included in exclusive profile 704, to the exclusive profile. For example, the media content system performs this task by displaying message 714, via user interface 730 of the user equipment (e.g., user equipment 102 of FIG. 1A). Message 714 provides content item recommendations as user-selectable options that correspond to content item identifiers that represent the content items that were not included in preference 708, which was initially selected to form exclusive profile 704. In other approaches, the media content system receives a user interface selection to manually search for a content item associated with a cluster of content items that was not initially included in exclusive profile 704. The media content system receives a user interface selection of an option to request a content item that was not a part of the preferences 708 (e.g., "The Notebook"). For example, 'The Notebook' was included as a part of preferences 706, which was not initially selected to form exclusive profile 704.

In response to receiving the user interface selection of the option to request the content item from the cluster that was not initially selected for inclusion in exclusive profile 704, the media content system displays message 716, via user interface 730 of the user equipment. Message 716 indicates to the user that the media content system will add consumption data 712 from the cluster of content items associated with the requested content item (e.g., Preferences 1), to exclusive profile 704. In other embodiments, message 716 indicates that the media content system will also retrieve the requested content item for playback. For example, by requesting to consume "The Notebook" (a content item from a preference cluster not initially selected for inclusion in exclusive profile 704), the media content system adds consumption data 712 corresponding to the cluster of content items to which "The Notebook" is associated (represented by the identifiers of preferences 706), to Bob Jones' exclusive profile 704. In this way, the previously created exclusive profile 704 is updated such that the media content system provides more accurate content recommendations to the user.

Alternatively, the media content system refines the preferences, recommendations and consumption data associated with exclusive profile 704 by receiving a user interface input indicating that the user would enjoy additional content recommendations from the same cluster of content items to which the consumed content item is associated. In this embodiment, the media content system receives a user interface input from the user (e.g., Bob Jones) to create an exclusive iFlix profile by selecting preferences 708 for inclusion in the exclusive profile 704. In response to creating an exclusive profile based on selected preferences 708, the media content system displays message 714, via user interface 730 of the user equipment. In other embodiments, the media content system displays message 714 upon detecting that the user has logged in to exclusive profile 704. Message 714 recommends content items for the user to consume that are associated with a cluster of content items that was not initially selected for inclusion in exclusive profile 704. For example, message 714 recommends content items such as "When Harry Met Sally," "Sleepless in Seattle" and "The Notebook," which are part of the cluster of content items represented by Preferences 1 706. Once the content item recommendations have been provided via message 714, the media content system monitors, from exclusive profile 704, user consumption of any of the content items recommended to the user in message 714. In another embodiment, the media content system monitors other user activity, such as click-through rates of the recommendations provided in message 714. The media content system may automatically integrate the consumption data associated with the recommended content items into exclusive profile 704 if the click-through rates exceed a click-through rate threshold value.

In response to detecting user consumption of a recommended content item, the media content system displays message 718, via user interface 730 of the user equipment. Message 718 provides a prompt, in the form of a "yes" or "no" question, asking if the user would like to receive additional content recommendations similar to the recommended content item that was consumed (e.g., "The Notebook" of Preferences 1). Message 718 provides user-selectable options (e.g., 'yes' and 'no') for responding to the prompt. Upon receiving a user interface selection of the "yes" option, the media content system will begin to recommend to exclusive profile 704 other content items associated with the recommended content item. For example, a user interface selection of the "yes" option indicates to the media content system that the user would enjoy additional content recommendations from Preferences 1 (the same cluster that 'The Notebook' is associated with). Accordingly, the media content system updates the consumption data associated with exclusive profile 704 to include the consumption data associated with the content items from the cluster represented by preferences 706, to provide more accurate content recommendations in the future. Upon receiving a user interface selection of the "no" option, the media content system maintains the current subset of recommendations for exclusive profile 704.

Figure 8:
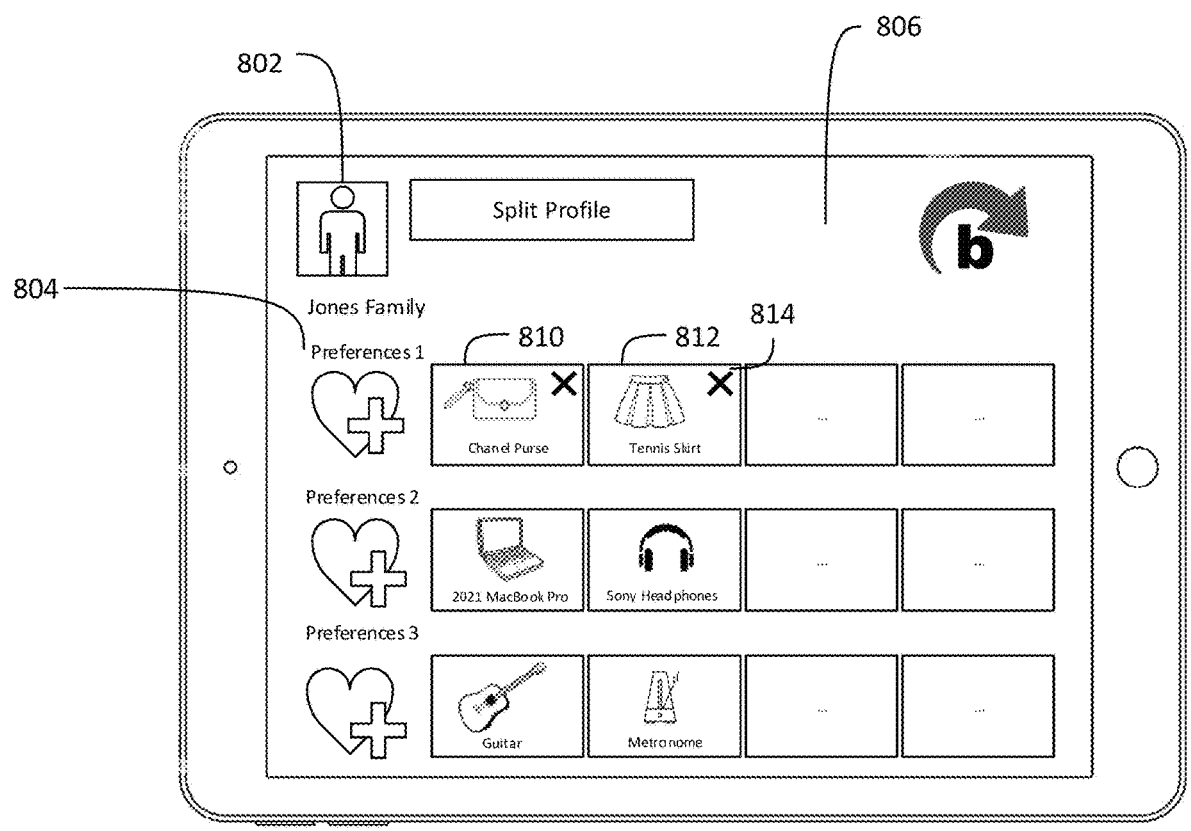
FIG. 8 is a schematic illustration of splitting a profile associated with an account of an electronic commerce platform, in accordance with embodiments of the disclosure.

FIG. 8 is a schematic illustration of splitting a profile associated with an account of an electronic commerce platform, in accordance with embodiments of the disclosure. While the previous examples described splitting a profile of a media content system (e.g., media content system 104 of FIGS. 1A-1B), it should be appreciated that the same techniques are applicable to any suitable account, such as, for example, an account of an electronic commerce platform, an account of a banking service provider, an account of a social media platform, or an account of any other suitable service provider or platform. The example of FIG. 8 depicts a user interface corresponding to the splitting of profile 802 (e.g., the "Jones Family" profile) of an electronic commerce platform.

In some approaches, profile 802 of the electronic commerce platform comprises consumption data, which includes purchase history, user interface interactions, favorited items, and any suitable data related to usage of the electronic commerce platform. In some embodiments, the electronic commerce platform enables the creation of profiles analogous to the profiles described in relation to the media content system of FIGS. 1A-1B. The profiles of the electronic commerce platform allow the platform to distinguish between the consumption habits of various users of the same account. In some approaches, the electronic commerce platform allows for the splitting of a profile into one or more exclusive profiles exclusively associated with a single user.

The electronic commerce platform, in some embodiments, identifies clusters of products with similar metadata, based on the techniques described herein, e.g., in relation to cluster identification described in FIGS. 1A-1B. The products, in some approaches, are analogous to the content items described in relation to the media content system of FIGS. 1A-1B. After identifying the clusters, the electronic commerce platform presents identifiers of the clusters, such as for example, identifier 804 of the "Preferences 1" cluster, as part of a user interface 806 displayed on a user device (e.g., user device 102 of FIGS. 1A-1B). In some approaches, user interface 806 also includes, alongside the identifiers of each cluster, identifiers of representative products from each identified cluster, such as for example, products 810 and 812, which correspond to the "Chanel Purse" and "Tennis Skirt," respectively. In some embodiments, user interface 806 also includes user-selectable options to modify the identified clusters by removing representative products, such as for example, user-selectable option 814. The electronic commerce platform, upon receiving a selection of user-selectable option 814, updates the cluster corresponding to the removed product based on the techniques described herein, e.g., in relation to FIGS. 3 and 4. In some approaches, the electronic commerce platform receives user interface inputs selecting a subset of the presented clusters and incorporates consumption data corresponding to the selected clusters into the new profile that results from the split. The electronic commerce platform, in some embodiments, uses the selected clusters to provide more tailored product recommendations to the exclusive profile.

Figure 10:
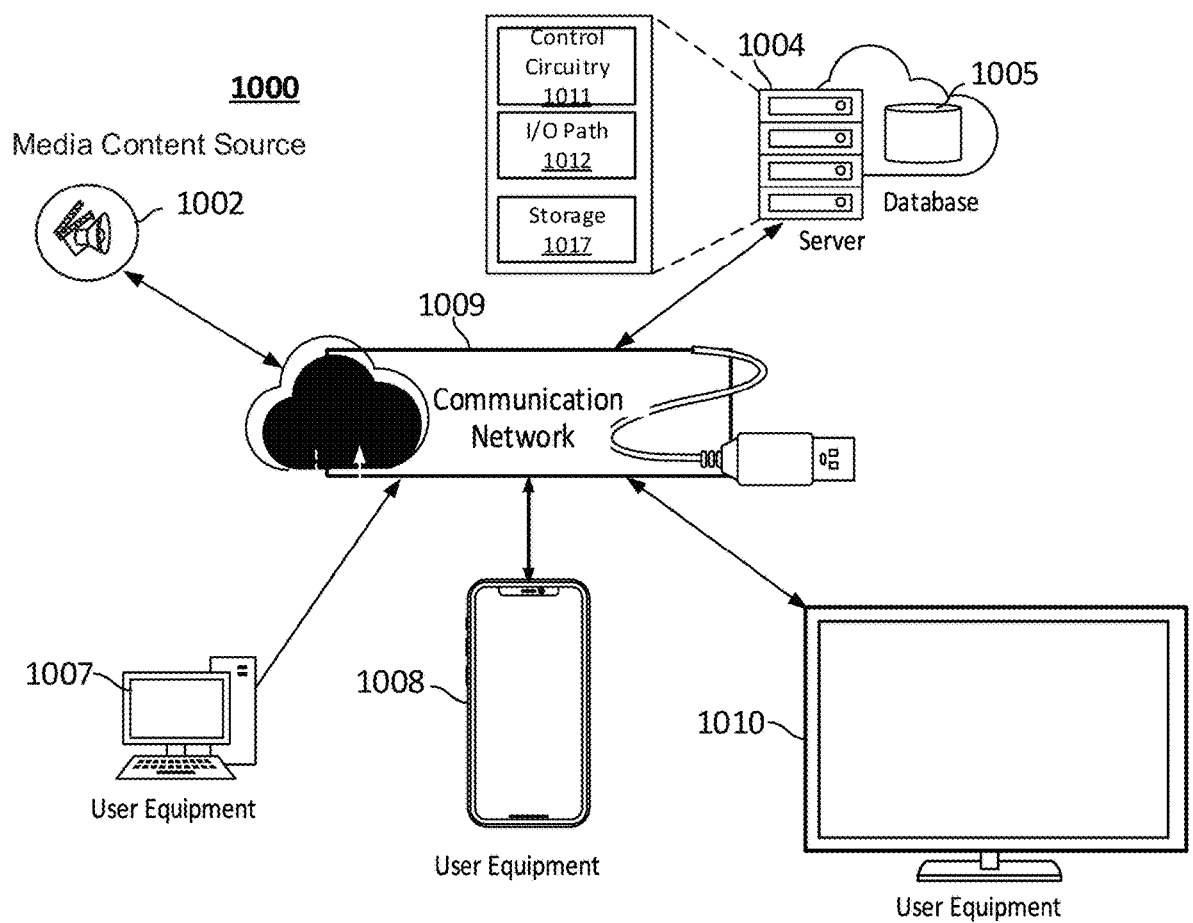
FIG. 10 shows illustrative devices and systems for splitting a profile associated with an account of a media content system, in accordance with some embodiments of this disclosure.

FIGS. 9-10 shows illustrative devices and systems for splitting a profile associated with an account of a media content system, in accordance with some embodiments of this disclosure.

FIG. 9 shows generalized embodiments of illustrative user equipment 900 and 901, which may correspond to, e.g., user equipment 102 of FIGS. 1A-1B. For example, user equipment 900 may be a smartphone device, a laptop, a tablet, a near-eye display device, an XR device, or any other suitable device. In another example, user equipment 901 may be a user television equipment system or device. User equipment 901 may include set-top box 916. Set-top box 916 may be communicatively connected to microphone 917, audio output equipment (e.g., speaker or headphones 914), and display 912. In some embodiments, microphone 917 may receive audio corresponding to a voice of a video conference participant and/or ambient audio data during a video conference. In some embodiments, display 912 may be a television display or a computer display. In some embodiments, set-top box 916 may be communicatively connected to user input interface 910. In some embodiments, user input interface 910 may be a remote-control device. In some embodiments, user input interface 910 also comprises I/O circuitry. Set-top box 916 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 10. In some embodiments, device 900 may comprise any suitable number of sensors (e.g., gyroscope or gyrometer, or accelerometer, etc.), and/or a GPS module (e.g., in communication with one or more servers and/or cell towers and/or satellites) to ascertain a location of device 900. In some embodiments, device 900 comprises a rechargeable battery that is configured to provide power to the components of the device.

Each one of user equipment 900 and user equipment 901 may receive content and data via input/output (I/O) path 902. I/O path 902 may provide content (e.g., broadcast programming, on-demand programming, internet content, content available over a local area network (LAN) or wide area network (WAN), and/or other content) and data to control circuitry 904, which may comprise processing circuitry 607 and storage 908. Control circuitry 904 may be used to send and receive commands, requests, and other suitable data using I/O path 902, which may comprise I/O circuitry. I/O path 902 may connect control circuitry 904 (and specifically processing circuitry 907) to one or more communications paths (described below). I/O functions may be provided by one or more of these communications paths, but are shown as a single path in FIG. 9 to avoid overcomplicating the drawing. While set-top box 916 is shown in FIG. 9 for illustration, any suitable computing device having processing circuitry, control circuitry, and storage may be used in accordance with the present disclosure. For example, set-top box 916 may be replaced by, or complemented by, a personal computer (e.g., a notebook, a laptop, a desktop), a smartphone (e.g., device 900), an XR device, a tablet, a network-based server hosting a user-accessible client device, a non-user-owned device, any other suitable device, or any combination thereof.

Control circuitry 904 may be based on any suitable control circuitry such as processing circuitry 907. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 904 executes instructions for the media application stored in memory (e.g., storage 908). Specifically, control circuitry 904 may be instructed by the media application to perform the functions discussed above and below. In some implementations, processing or actions performed by control circuitry 904 may be based on instructions received from the media application.

In client/server-based embodiments, control circuitry 904 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 9, the instructions may be stored in storage 908, and executed by control circuitry 904 of a device 900.

In some embodiments, the media application may be a client/server application where only the client application resides on device 900, and a server application resides on an external server (e.g., server 1004 and/or media content source 1002). For example, the media application may be implemented partially as a client application on control circuitry 904 of device 900 and partially on server 1004 as a server application running on control circuitry 1011. Server 1004 may be a part of a local area network with one or more of devices 900, 901 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1004 and/or an edge computing device), referred to as "the cloud." Device 900 may be a cloud client that relies on the cloud computing capabilities from server 1004 to generate personalized engagement options in a VR environment. The client application may instruct control circuitry 904 to generate personalized engagement options in a VR environment.

Control circuitry 904 may include communications circuitry suitable for communicating with a server, edge computing systems and devices, a table or database server, or other networks or servers. The instructions for carrying out the above-mentioned functionality may be stored on a server (which is described in more detail in connection with FIG. 10). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 10). In addition, communications circuitry may include circuitry that enables peer-to-peer communication of user equipment, or communication of user equipment in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media application data described above. Nonvolatile memory may also be used (e.g., to launch a boot-up routine and other instructions). Cloud-based storage, described in relation to FIG. 9, may be used to supplement storage 908 or instead of storage 908.

Control circuitry 904 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 904 may also include scaler circuitry for upconverting and downconverting content into the preferred output format of user equipment 900. Control circuitry 904 may also include digital-to-analog converter circuitry and analog-to-digital converter circuitry for converting between digital and analog signals. The tuning and encoding circuitry may be used by user equipment 900, 901 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of user equipment 900 and user equipment 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 916.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of device 900 and device 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 917 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The media application may be implemented using any suitable architecture. For example, it may be a stand-alone application wholly implemented on each one of user equipment 900 and user equipment 901. In such an approach, instructions of the application may be stored locally (e.g., in storage 908), and data for use by the application is downloaded on a periodic basis (e.g., from an out-of-band feed, from an internet resource, or using another suitable approach). Control circuitry 904 may retrieve instructions of the application from storage 908 and process the instructions to provide video conferencing functionality and generate any of the displays discussed herein. Based on the processed instructions, control circuitry 904 may determine what action to perform when input is received from user input interface 910. For example, movement of a cursor on a display up/down may be indicated by the processed instructions when user input interface 910 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, participation data from a conference participant profile. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the media application is a client/server-based application. Data for use by a thick or thin client implemented on each one of user equipment 900 and user equipment 901 may be retrieved on-demand by issuing requests to a server remote to each one of user equipment 900 and user equipment 901. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on device 900. This way, the processing of the instructions is performed remotely by the server while the resulting displays (e.g., that may include text, a keyboard, or other visuals) are provided locally on device 900. Device 900 may receive inputs from the user via input interface 910 and transmit those inputs to the remote server for processing and generating the corresponding displays. For example, device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to device 900 for presentation to the user.

In some embodiments, the media application may be downloaded and interpreted or otherwise run by an interpreter or virtual machine (run by control circuitry 904). In some embodiments, the media application may be encoded in the ETV Binary Interchange Format (EBIF), received by control circuitry 904 as part of a suitable feed, and interpreted by a user agent running on control circuitry 904. For example, the media application may be an EBIF application. In some embodiments, the media application may be defined by a series of JAVA-based files that are received and run by a local virtual machine or other suitable middleware executed by control circuitry 904. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 10, user equipment 1006, 1007, 1008, 1010 (which may correspond to, e.g., user equipment 102 of FIGS. 1A-1B) may be coupled to communication network 1009. Communication network 1009 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1009) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 1009.

System 1000 may comprise media content source 1002, one or more servers 1004, database 1005, and/or one or more edge computing devices. In some embodiments, the media application may be executed at one or more of control circuitry 1011 of server 1004 (and/or control circuitry of user equipment 1007, 1008, 1010 and/or control circuitry of one or more edge computing devices). In some embodiments, the media content source and/or server 1004 may be configured to host or otherwise facilitate video communication sessions between user equipment 1007, 1008, 1010 and/or any other suitable user equipment, and/or host or otherwise be in communication (e.g., over network 1009) with one or more social network services.

In some embodiments, server 1004 may include control circuitry 1011 and storage 1017 (e.g., RAM, ROM, Hard Disk, Removable Disk, etc.). Storage 1017 may store one or more databases. Server 1004 may also include an I/O path 1012. I/O path 1012 may provide video conferencing data, device information, or other data, over a local area network (LAN) or wide area network (WAN), and/or other content and data to control circuitry 1011, which may include processing circuitry, and storage 1017. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 1011 executes instructions for an emulation system application stored in memory (e.g., the storage 1017). Memory may be an electronic storage device provided as storage 1017 that is part of control circuitry 1011.

Figure 11:
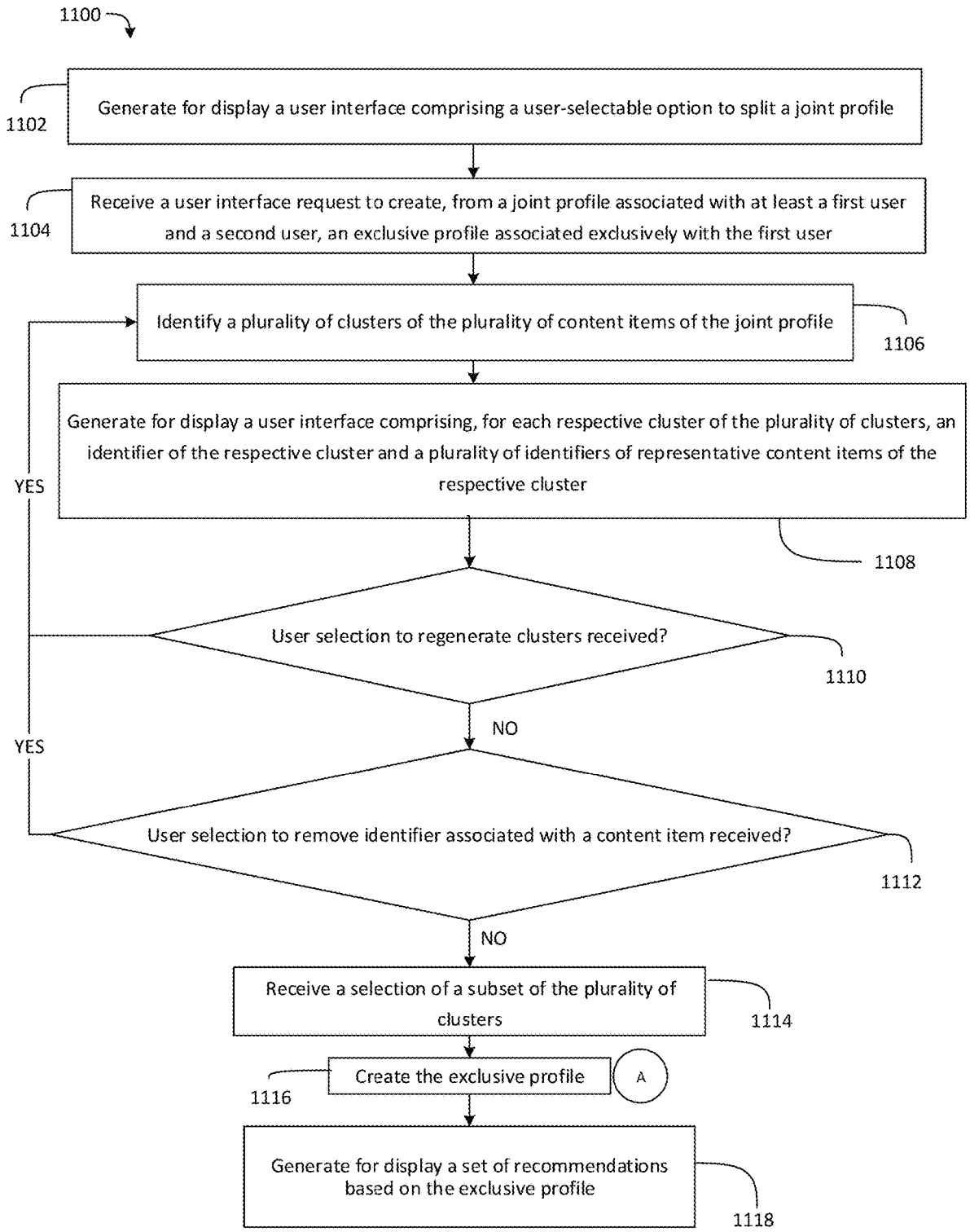
FIG. 11 is a flowchart of a detailed illustrative process for splitting a profile associated with an account of a media content system, in accordance with some embodiments of this disclosure.

FIG. 11 is a flowchart of a detailed illustrative process for splitting a profile associated with an account of a media content system, in accordance with some embodiments of this disclosure. In various embodiments, the individual steps of process 1100 may be implemented by one or more components of the devices and systems of FIGS. 1-10. Although the present disclosure may describe certain steps of process 1100 (and of other processes described herein) as being implemented by certain components of the devices and systems of FIGS. 1-10, this is for purposes of illustration only, and it should be understood that other components of the devices and systems of FIGS. 1-10 may implement those steps instead.

Process 1100 begins at step 1102, where a control circuitry (for example, control circuitry 904 of FIG. 9, or control circuitry 1011 of FIG. 10), generates for display, on a display (e.g., display 912) of a user device (e.g., user equipment 900, 901 of FIG. 9, or user equipment 1006, 1007, 1008, or 1010 of FIG. 10), a user interface comprising a user-selectable option to split a joint profile (e.g., user interface 108 of FIG. 1A, which comprises user-selectable option 110 to split an existing profile). I/O circuitry, in some embodiments, communicates with server 1004 to retrieve user interface data from a media content system or a media content source (e.g., media content system 104 of FIG. 1, or media content source 1002).

The process 1100 then continues at step 1104, where the media content system receives, via a user input interface (e.g., user input interface 910 of FIG. 9), a request to create, from a joint profile associated with at least a first user and a second user (e.g., joint profile 602 of FIG. 6, joint profile 702 of FIG. 7, or profile 106 of FIG. 1), an exclusive profile associated exclusively with the first user (e.g., exclusive profiles 604 and 606 of FIG. 6, exclusive profile 704 of FIG. 7, or profile 142 of FIG. 1B). In other approaches, the joint profile is a profile used by a single user, and the media content system receives, via the user input interface, a user interface selection to split the joint profile into an exclusive profile that represents a subset of the user's preferences from the joint profile. In some embodiments, each joint profile comprises consumption data, which the media content system stores in a storage (e.g., storage 1017 of FIG. 10) or a database (e.g., database 1005 of FIG. 10).

At step 1106, the media content system, via the control circuitry, identifies a plurality of clusters (e.g., clusters 124, 126, and 128 of FIG. 1B) of the plurality of content items of the joint profile (e.g., in any manner as shown in FIGS. 1A-10). The media content system, in some approaches, in response to receiving the request to create the exclusive profile, communicates with one or more servers (e.g., server 1004 of FIG. 10) via I/O circuitry to retrieve consumption data corresponding to the joint profile (e.g., consumption data 112 of FIGS. 1A-1B), which is used to identify the clusters.

At step 1108, the media content system, via control circuitry, displays, on a user input interface, an identifier of each cluster along with a plurality of identifiers corresponding to representative content items of each cluster (e.g., identifier 132 of FIG. 1B). In some approaches, the media content system displays, on the user input interface, a user-selectable option (e.g., user-selectable options 134, 136, and 138 of FIGS. 1A-1B) corresponding to each of the one or more of the identified clusters. Upon receiving, via the user input interface, a selection of one of the user-selectable options, the control circuitry adds the cluster corresponding to the selected option to the exclusive profile. In some embodiments, the control circuitry also displays, on the user input interface, a user-selectable option to regenerate the clusters, in order to receive user input refining the clusters. At step 1110, the control circuitry determines whether a user input from the user input interface to regenerate the clusters has been received. If the control circuitry detects a selection of the user-selectable option to regenerate the clusters from the user input interface, the process 1100 moves back to step 1106, and the media content system, via the control circuitry, identifies a new plurality of clusters based on the consumption data corresponding to the joint profile. At step 1110, if a selection of the user-selectable option to regenerate the clusters is not received, the process 1100 moves to step 1112.

At step 1112, the control circuitry determines whether a user interface input to remove identifiers associated with content items has been received. In some examples, the control circuitry displays an option on the user input interface to remove identifiers corresponding to content items as a way to further refine the identified clusters and match the user's actual preferences. If the user input interface receives a selection to remove a particular identifier corresponding to a content item, the process 1100 moves back to step 1106, and the media content system, via the control circuitry, identifies a new plurality of clusters based on the consumption data corresponding to the joint profile. In some approaches, the control circuitry does not regenerate all the clusters, and instead updates or splits the cluster (e.g., as shown in FIGS. 3 and 4). If the user input interface does not receive a selection to remove a particular identifier corresponding to a content item, the process 1100 moves to step 1114.

At step 1114, the user input interface receives a selection of one or more of the identifiers of each cluster. Upon receiving the selection, the process 1100 moves to step 1116, where the media content system, via the control circuitry, creates the exclusive profile by adding each of the clusters corresponding to the selected identifiers and the associated consumption data from the joint profile to the exclusive profile. The process 1100 concludes at step 1118, where the control circuitry generates for display on a user input interface a set of content item recommendations based on the exclusive profile.

Figure 12:
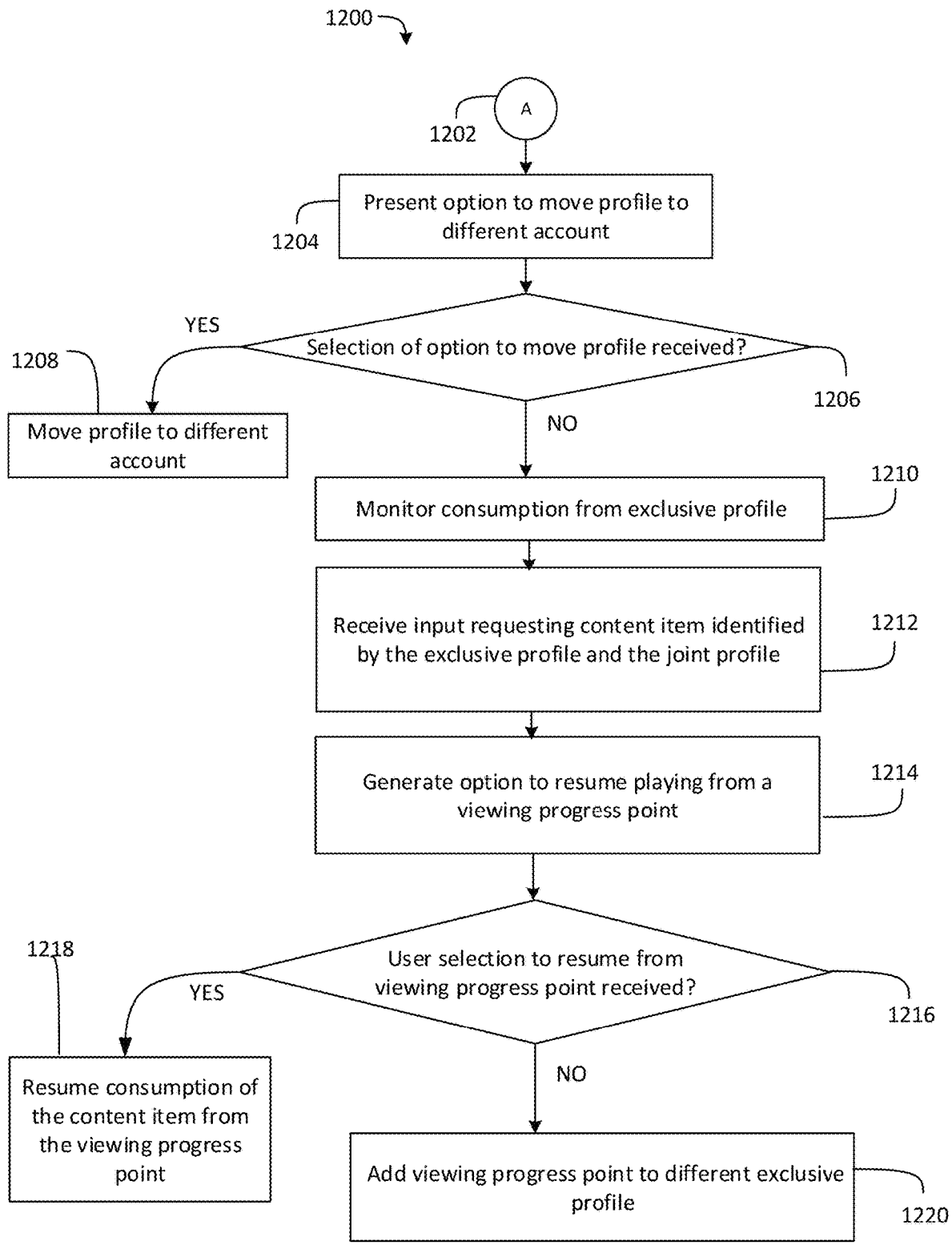
FIG. 12 is a flowchart of a detailed illustrative process for splitting a profile associated with an account of a media content system, in accordance with some embodiments of this disclosure.

FIG. 12 is a flowchart of a detailed illustrative process for splitting a profile associated with an account of a media content system, in accordance with some embodiments of this disclosure. In various embodiments, the individual steps of process 1200 may be implemented by one or more components of the devices and systems of FIGS. 1-11. Although the present disclosure may describe certain steps of process 1200 (and of other processes described herein) as being implemented by certain components of the devices and systems of FIGS. 1-11, this is for purposes of illustration only, and it should be understood that other components of the devices and systems of FIGS. 1-11 may implement those steps instead.

Process 1200 begins at step 1202 (which corresponds to step 1116 of FIG. 11), where the media content system, via the control circuitry (e.g., control circuitry 904 of FIG. 9, or control circuitry 1011 of FIG. 10), creates an exclusive profile based on the selected clusters and the associated consumption data from the joint profile. At step 1204, the media content system, via the user input interface (e.g., user input interface 910 of FIG. 9), presents an option to move the exclusive profile to a different account (e.g., an account as shown in FIGS. 1A and 1B). At step 1206, the control circuitry determines whether a user interface selection of the option to move the profile to a different account has been received from the user input interface. If the user input interface receives a user-input selection of the option to move the exclusive profile, the process continues to step 1208, where the control circuitry adds the exclusive profile to a different account. If the user input interface does not receive a user-input selection from the user input interface to move the exclusive profile, the process moves to step 1210.

At step 1210, the control circuitry monitors the consumption of content items recommended for the created exclusive profile. In some embodiments, as fully described in FIG. 6, the consumption data (e.g., consumption data 112 of FIG. 1A and consumption data 712 of FIG. 7) associated with each content item includes viewing progress point information. In some examples, when the control circuitry creates the exclusive profile, the exclusive profile inherits consumption data corresponding to the user-selected clusters, from the joint profile. After the creation of the exclusive profile, the media content system recommends, via the control circuitry, content items from the joint profile. Based on the media consumption habits detected for the exclusive profile, the control circuitry determines whether the user continues to consume content items of the exclusive profile that were also included as a recommendation in the joint profile. At step 1212, the media content system, via the user input interface, receives a user interface input from the user input interface requesting a content item identified as a recommendation in both the joint profile and the created exclusive profile.

As was shown in more detail in FIG. 6, the control circuitry, in some embodiments, identifies one or more viewing progress points corresponding to the requested content item. In some examples, one or more viewing progress points are a part of the consumption data inherited from the joint profile. In some embodiments, there are multiple exclusive profiles generated from a joint profile, and the control circuitry must determine which exclusive profile each viewing progress point corresponds to. At step 1214, the media content system, via control circuitry, generates a user-selectable option (e.g., user-selectable option 610) on the user input interface to resume playing the requested content item from an identified viewing progress point. At step 1216, the control circuitry determines whether a user input selection of the generated option has been received from the user input interface. In response to receiving a user interface selection of the option to resume playing the requested content item from the identified viewing progress point, the process continues to step 1218. At step 1218, the control circuitry resumes consumption of the requested content from the identified viewing progress point. In response to not receiving a user interface selection of the option to resume playing the requested content item from the identified viewing progress point, the process continues to step 1220. At step 1220, the control circuitry determines that the identified viewing progress point does not belong to the requesting user associated with the exclusive profile and adds the viewing progress point information to a different exclusive profile associated with a different user.

Figure 13:
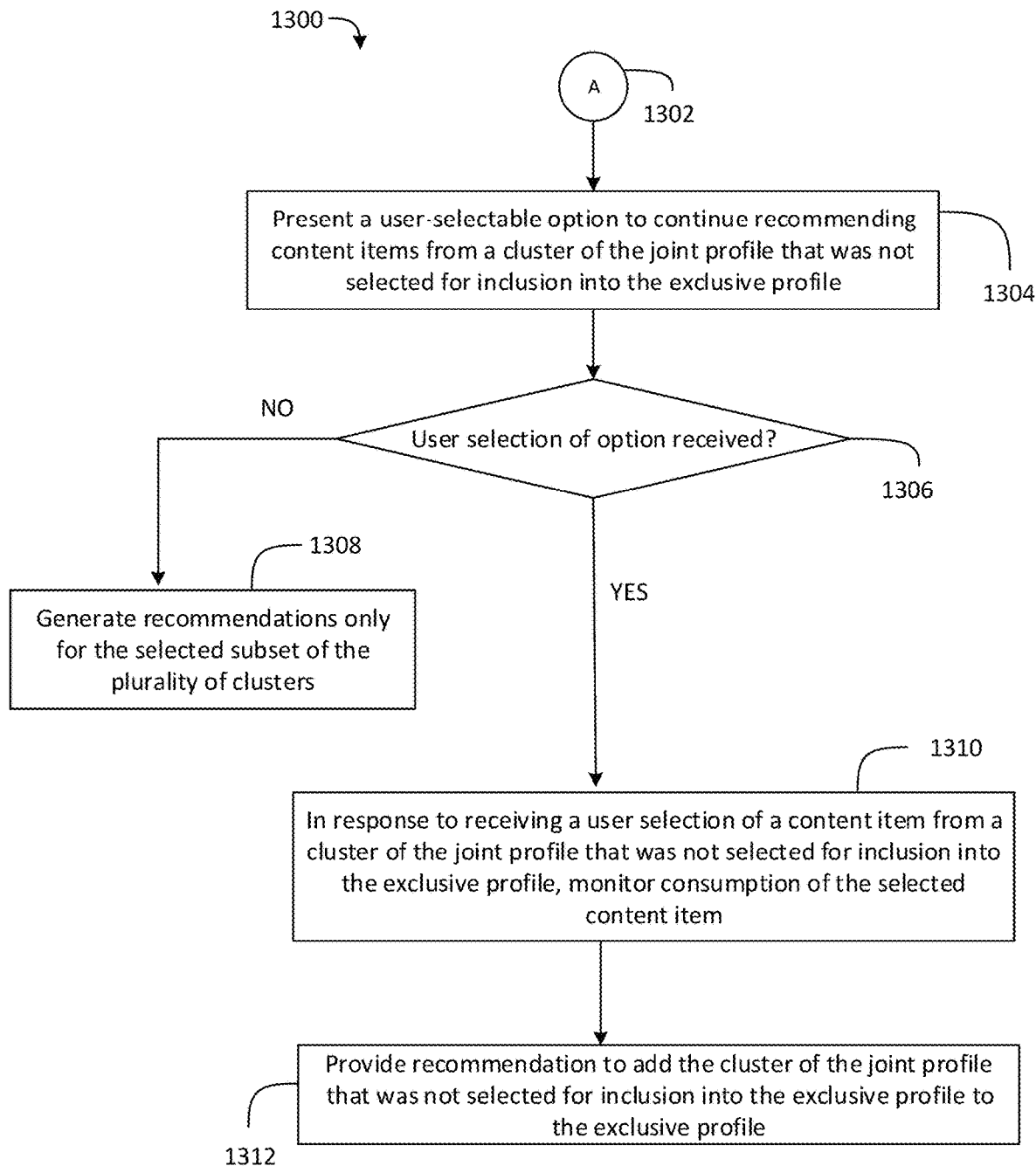
FIG. 13 is a flowchart of a detailed illustrative process for splitting a profile associated with an account of a media content system, in accordance with some embodiments of this disclosure.

FIG. 13 is a flowchart of a detailed illustrative process for splitting a profile associated with an account of a media content system, in accordance with some embodiments of this disclosure. In various embodiments, the individual steps of process 1300 may be implemented by one or more components of the devices and systems of FIGS. 1-12. Although the present disclosure may describe certain steps of process 1300 (and of other processes described herein) as being implemented by certain components of the devices and systems of FIGS. 1-12, this is for purposes of illustration only, and it should be understood that other components of the devices and systems of FIGS. 1-12 may implement those steps instead.

Process 1300 begins at step 1302 (which corresponds to step 1116 of FIG. 11 and step 1202 of FIG. 12), where the media content system (e.g., media content system 104 of FIGS. 1A-1B) via the control circuitry (e.g., control circuitry 904 of FIG. 9, or control circuitry 1011 of FIG. 10), creates an exclusive profile based on the selected clusters and the associated consumption data from the joint profile. After the exclusive profile is created, the process 1300 continues at step 1304, where the control circuitry presents, on a user input interface (e.g., user input interface 910), a user-selectable option to continue recommending content items from a cluster of the joint profile that was not selected for inclusion into the exclusive profile. The control circuitry, in some approaches, compares the consumption history corresponding to the content items consumed by the exclusive profile to the consumption data associated with the clusters of the joint profile that were not selected for inclusion into the exclusive profile, both of which are stored in storage 1017 or in database 1005. In some embodiments, the control circuitry determines, based on the media consumption habits of the exclusive profile, that one or more clusters of the joint profile that were not selected for inclusion into the exclusive profile during the split are in fact relevant to the exclusive profile. In response to this determination, the control circuitry, in some embodiments, presents the option to continue recommending content items from the cluster of the joint profile that was not selected for inclusion into the exclusive profile. In some approaches, the control circuitry bases its determination on whether a new set of content items consumed by the exclusive profile would have belonged to one or more clusters of the joint profile that were not selected for inclusion into the exclusive profile. In some embodiments, the control circuitry determines a center and radius for each cluster of the joint profile and compares the distance of the content property vectors corresponding to newly consumed content items from the exclusive profile to each of the centers and with each of the radiuses.

The process 1300 continues at step 1306, where the control circuitry determines whether a user interface selection of the user-selectable option to continue recommending content items from the cluster of the joint profile that was not selected for inclusion in the exclusive profile has been received. If the user input interface receives a selection of the user-selectable option, the process continues at step 1310, and the control circuitry, in response to receiving a user selection of a content item from the cluster of the joint profile that was not selected for inclusion into the exclusive profile, monitors consumption of the selected content item.

The process 1300 moves to step 1312, where the control circuitry provides a recommendation to add to the exclusive profile the cluster of the joint profile that was not selected for inclusion into the exclusive profile. In some approaches, the control circuitry counts the number of content items consumed by the exclusive profile that have corresponding content property vectors that fall within a particular cluster of the joint profile. In some embodiments, if the number of content items consumed by the exclusive profile that fall within a particular cluster of the joint profile is greater than a threshold, the control circuitry provides the recommendation to merge the particular cluster into the exclusive profile.

In some implementations, the control circuitry continues to provide recommendations linked with a preference cluster of the joint profile that was not selected for inclusion in the exclusive profile. In some approaches, the control circuitry monitors a click-through rate of the recommendations, and if the rate exceeds a threshold, the control circuitry may either present the user-selectable option to continue providing recommendations from the cluster or automatically integrate the cluster into the exclusive profile. In some approaches, based on the determination that one or more clusters of the joint profile that were not selected for inclusion into the exclusive profile during the split are in fact relevant to the exclusive profile, the control circuitry presents, on the user input interface, a user-selectable option to the joint profile prompting a user input indicating whether the cluster should be removed from the joint profile. In some approaches, the user input that indicates whether or not the cluster should be removed from the joint profile indicates whether the cluster is relevant to the exclusive profile and not the joint profile, whether the cluster is relevant to the joint profile but not relevant to the exclusive profile, or whether the cluster is relevant to both profiles. In some embodiments, the determination of whether or not a cluster is relevant to the joint profile, the exclusive profile, or both is based on a time component or a number of interactions with the media content system by each profile.

If, at step 1306, the user input interface does not receive a selection of the user-selectable option to continue recommending content items from the cluster of the joint profile that was not selected for inclusion in the exclusive profile, the process 1300 continues at step 1308, where the control circuitry generates recommendations of content items only from the clusters selected for inclusion into the exclusive profile.

Figure 14A:
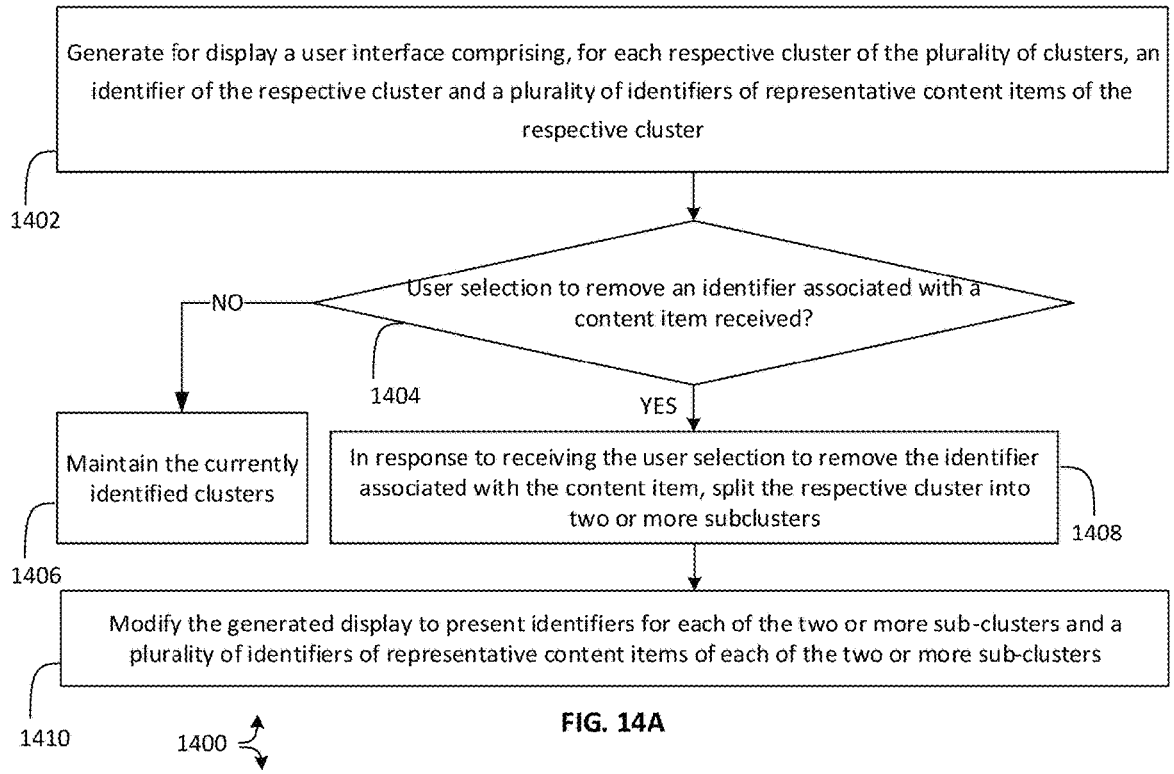
FIG. 14A is a flowchart of a detailed illustrative process for updating a cluster identified from a profile in response to user input, in accordance with some embodiments of this disclosure.
Figure 14B:
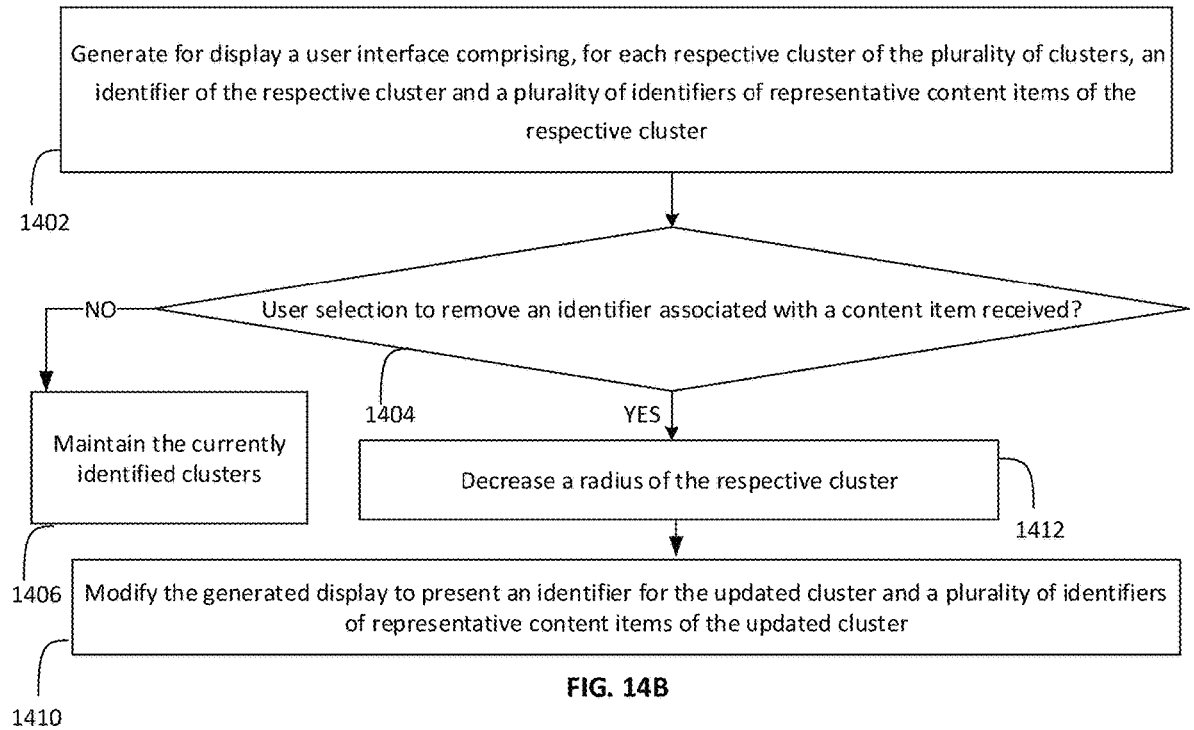
FIG. 14B is a flowchart of a detailed illustrative process for updating a cluster identified from a profile in response to user input, in accordance with some embodiments of this disclosure.

FIGS. 14A and 14B are flowcharts of a detailed illustrative process for updating a cluster identified from a profile in response to user input, in accordance with some embodiments of this disclosure. In various embodiments, the individual steps of process 1400 may be implemented by one or more components of the devices and systems of FIGS. 1-13. Although the present disclosure may describe certain steps of process 1400 (and of other processes described herein) as being implemented by certain components of the devices and systems of FIGS. 1-13, this is for purposes of illustration only, and it should be understood that other components of the devices and systems of FIGS. 1-13 may implement those steps instead.

Process 1400 begins at step 1402 of FIG. 14A, where the media content system (e.g., media content system 104 of FIGS. 1A-1B), via a control circuitry (e.g., control circuitry 904 of FIG. 9, or control circuitry 1011 of FIG. 10), generates for display, on a user input interface (e.g., user input interface 910 of FIG. 9) of a user device (e.g., user device 102 of FIGS. 1A-1B), a user interface (e.g., user interface 130 of FIG. 1A) which, for each identified cluster, displays an identifier of the respective cluster and a plurality of identifiers of representative content items of the respective cluster. At step 1404, the control circuitry determines whether a user interface selection to remove an identifier associated a content item has been received. The user interface, in some embodiments, comprises an option to remove identifiers corresponding to content items, such that receiving a selection of the option to remove the identifier corresponding to the content item causes the media content system to update the cluster to reflect the removal of the content item from the cluster.

If, at step 1404, the user input interface does not receive a user selection to remove an identifier associated with a content item, the process 1400 moves to step 1406, where the control circuitry maintains the currently identified clusters. If, at step 1404, the user input interface does receive a user selection to remove an identifier associated with a content item, the process 1400 moves to step 1408 of FIG. 14A, where the control circuitry splits the respective cluster into two or more sub-clusters. At step 1410, the control circuitry modifies the generated display to present identifiers for each of the sub-clusters along with a plurality of identifiers of representative content items of each sub-cluster.

Alternatively, if, at step 1404, the user input interface does receive a user selection to remove an identifier associated with a content item, the process 1400 may instead move to step 1412 of FIG. 14B, where the control circuitry decreases a radius of the respective cluster. In some approaches, the control circuitry tightens a similarity threshold of the cluster or adjusts one or more criteria of the cluster to account for the exclusion of the content item. Process 1400 of FIG. 14B concludes by modifying, at an alternative step 1410, the generated display to present identifiers for the updated cluster.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    receiving a user interface request to create for an account of a media service an exclusive profile associated exclusively with a first user, based on a joint profile that was previously used to request a plurality of content items from the media service by inputs received from at least the first user,
        wherein the joint profile comprises consumption data for the plurality of content items;
    identifying a plurality of clusters based on the plurality of content items of the joint profile, wherein each cluster comprises content items with similar metadata;
    generating for display a user interface comprising, for each respective cluster of the plurality of clusters:
        an identifier of the respective cluster;
        a plurality of identifiers of representative content items of the respective cluster;
    receiving a selection of a subset of the plurality of clusters via the user interface;
    generating the exclusive profile, wherein the exclusive profile comprises consumption data for content items of the selected subset of the plurality of clusters; and
    generating for display a set of recommendations based on the exclusive profile.

2. The method of claim 1, further comprising:
    receiving a user interface input, via a device logged in to the exclusive profile, requesting a content item identified by the joint profile, wherein the joint profile indicates a viewing progress point for the content item, wherein the viewing progress point was set before the generation of the exclusive profile;
    generating for display a user-selectable option, on the device logged in to the exclusive profile, to resume playing the content item from the viewing progress point; and
    in response to a user interface selection rejecting the option to resume playing the content item from the viewing progress point, adding the viewing progress point to a different exclusive profile associated with a second user.

3. The method of claim 1, further comprising:
    receiving a user interface input, via a device logged in to the exclusive profile, requesting a content item identified by the joint profile, wherein the joint profile indicates a first viewing progress point and a second viewing progress point for the content item;
    generating for display a user-selectable option, to the first user associated with the exclusive profile, to resume playing the content item from either of the first viewing progress point or the second viewing progress point; and
    in response to detecting a user interface selection of the user-selectable option to resume playing the content item from the first viewing progress point:
        resuming playing of the content item from the first viewing progress point; and
        adding the second viewing progress point to a different exclusive profile associated with the second user.

4. The method of claim 1, further comprising:
    receiving via a device logged in to the exclusive profile a request for consuming a content item; and
    in response to determining that the content item is included in a cluster of the plurality of clusters, wherein the cluster was not selected for inclusion into the exclusive profile using the user interface that included identifiers of the plurality of clusters:
        adding consumption data for content items of the cluster to the exclusive profile.

5. The method of claim 1, wherein each content item of the plurality of content items is associated with respective metadata defining a plurality of weights for a plurality of content properties.

6. The method of claim 5, wherein the identifying the plurality of clusters comprises determining distances between content items of the plurality of content items of the joint profile, and wherein each distance is computed based on respective pluralities of weights of respective content items of the plurality of content items.

7. The method of claim 6, wherein the plurality of weights for the plurality of content properties are arranged as a vector, and wherein the determined distances are calculated based on a similarity function.

8. The method of claim 7, wherein the similarity function is at least one of: (a) a Euclidian distance between the vector associated with each content item of a pair of content items, (b) a cosine similarity, or (c) a Jaccard index.

9. The method of claim 1, wherein the plurality of identifiers of representative content items of the respective cluster are generated for display in an order based on distances of the content items from a center of the respective cluster, and wherein representative identifiers associated with outliers farthest from the center of the respective cluster are displayed before the representative identifiers associated with content items closest to the center of the respective cluster.

10. The method of claim 9, further comprising:
in response to receiving a user interface input to remove a representative identifier associated with an outlier from the plurality of representative identifiers of content items of the respective cluster:
    decreasing a radius of the respective cluster; and
    modifying the generated display with identifiers associated with the respective cluster with decreased radius.

11. The method of claim 1, further comprising:
receiving a user interface input to remove a representative identifier of a content item of the displayed plurality of representative identifiers of content items of the respective cluster;
in response to the receiving the user interface input to remove the representative identifier of the content item of the displayed plurality of representative identifiers of content items of the respective cluster, splitting the respective cluster into two or more sub-clusters; and
modifying the generated display to present:
    an identifier for each of the two or more sub-clusters; and
    a plurality of identifiers of representative content items of each of the two or more sub-clusters.

12. The method of claim 1, further comprising, in response to generating the exclusive profile:
monitoring consumption, from the exclusive profile, of a set of recommendations based on the cluster associated with the joint profile; and
in response to the monitoring, generating for display a user-selectable option to continue providing recommendations from the cluster associated with the joint profile that is not within the exclusive profile.

13. The method of claim 1, wherein the generating for display the user interface further comprises:
determining that the respective cluster comprises content items within a collection; and
displaying an identifier associated with the collection.

14. The method of claim 1, further comprising:
generating for display a user-selectable option to include the cluster associated with the joint profile in the exclusive profile; and
wherein the adding consumption data for content items of the cluster to the exclusive profile is performed in response to acceptance of the option to include the cluster associated with the joint profile in the exclusive profile.

15. A system comprising:
a memory;
an input/output (I/O) circuitry configured to:
    receive a user interface request to create for an account of a media service an exclusive profile associated exclusively with a first user, based on a joint profile that was previously used to request a plurality of content items from the media service by inputs received from at least the first user,
    wherein the joint profile comprises consumption data for the plurality of content items, and wherein the consumption data is stored in the memory;
a control circuitry configured to:
    identify a plurality of clusters based on the plurality of content items of the joint profile, wherein each cluster comprises content items with similar metadata;
wherein the I/O circuitry is further configured to:
    generate for display a user interface comprising, for each respective cluster of the plurality of clusters:
        an identifier of the respective cluster;
        a plurality of identifiers of representative content items of the respective cluster; and
    receive a selection of a subset of the plurality of clusters via the user interface; and
wherein the control circuitry is further configured to:
    generate the exclusive profile, using the control circuitry, wherein the exclusive profile comprises consumption data for content items of the selected subset of the plurality of clusters; and
wherein the I/O circuitry is further configured to:
    generate for display a set of recommendations based on the exclusive profile.

16. The system of claim 15, wherein the I/O circuitry is further configured to:
receive a user interface input, via a device logged in to the exclusive profile, requesting a content item identified by the joint profile, wherein the joint profile indicates a viewing progress point for the content item, wherein the viewing progress point was set before the generation of the exclusive profile; and
generate for display a user-selectable option, on the device logged in to the exclusive profile, to resume playing the content item from the viewing progress point; and
wherein the control circuitry is further configured to:
    in response to a user interface selection rejecting the option to resume playing the content item from the viewing progress point, add the viewing progress point to a different exclusive profile associated with a second user, using the control circuitry.

17. The system of claim 15, wherein the I/O circuitry is further configured to:
receive a user interface input, via a device logged in to the exclusive profile, requesting a content item identified by the joint profile, wherein the joint profile indicates a first viewing progress point and a second viewing progress point for the content item; and
generate for display a user-selectable option, to the first user associated with the exclusive profile, to resume playing the content item from either of the first viewing progress point or the second viewing progress point; and
in response to detecting a user interface selection of the user-selectable option to resume playing the content item from the first viewing progress point,
wherein the control circuitry is further configured to:
    resume playing of the content item from the first viewing progress point; and
    add the second viewing progress point to a different exclusive profile associated with the second user, using the control circuitry.

18. The system of claim 15, wherein the I/O circuitry is further configured to:
- receive via a device logged in to the exclusive profile a request for consuming a content item; and
- wherein the control circuitry is further configured to:
  - in response to determining that the content item is included in a cluster of the plurality of clusters, wherein the cluster was not selected for inclusion into the exclusive profile using the user interface that included identifiers of the plurality of clusters:
  - add consumption data for content items of the cluster to the exclusive profile.

19. The system of claim 15, wherein each content item of the plurality of content items is associated with respective metadata defining a plurality of weights for a plurality of content properties.

20. The system of claim 19, wherein the control circuitry is configured to identify the plurality of clusters by determining distances between content items of the plurality of content items of the joint profile, and wherein each distance is computed based on respective pluralities of weights of respective content items of the plurality of content items.

* * * * *